United States Patent
Collett et al.

(10) Patent No.: US 10,962,985 B2
(45) Date of Patent: Mar. 30, 2021

(54) TRAFFIC MANAGEMENT FOR MATERIALS HANDLING VEHICLES IN A WAREHOUSE ENVIRONMENT

(71) Applicant: Crown Equipment Corporation, New Bremen, OH (US)

(72) Inventors: Toby Collett, Auckland (NZ); Sam McArdle, Auckland (NZ); Sian Phillips, Auckland (NZ); Greg Sumner, Auckland (NZ)

(73) Assignee: Crown Equipment Corporation, New Bremen, OH (US)

( * ) Notice: Subject to any disclaimer, the term of this patent is extended or adjusted under 35 U.S.C. 154(b) by 0 days.

(21) Appl. No.: 16/861,935

(22) Filed: Apr. 29, 2020

(65) Prior Publication Data

US 2020/0264633 A1 Aug. 20, 2020

Related U.S. Application Data

(63) Continuation of application No. 16/046,400, filed on Jul. 26, 2018, now Pat. No. 10,671,087.
(Continued)

(51) Int. Cl.
*G05D 1/02* (2020.01)
*G08G 1/16* (2006.01)
(Continued)

(52) U.S. Cl.
CPC ......... *G05D 1/0289* (2013.01); *G01C 21/206* (2013.01); *G05D 1/0088* (2013.01);
(Continued)

(58) Field of Classification Search
CPC ............... G05D 1/0289; G05D 1/0088; G05D 2201/0216; G08G 1/162; G08G 1/166; G01C 21/206
See application file for complete search history.

(56) References Cited

U.S. PATENT DOCUMENTS 5,539,398 A * 7/1996 Hall ........................ G08G 1/087
340/906
8,381,982 B2 * 2/2013 Kunzig ................ G05D 1/0291
235/462.08
(Continued)

FOREIGN PATENT DOCUMENTS

CN 203038471 7/2013
CN 106781562 5/2017
(Continued)

OTHER PUBLICATIONS

International Search Report and Written Opinion dated Jan. 7, 2019 pertaining to International Application No. PCT/US2018/043880.
(Continued)

*Primary Examiner* — Babar Sarwar
(74) *Attorney, Agent, or Firm* — Dinsmore & Shohl, LLP

(57) ABSTRACT

Systems and methods for a materials handling vehicle to navigate a vehicle transit surface in a warehouse environment including a navigation subsystem configured to cooperate with a traction control unit, a braking system, a steering assembly, and an obstacle detection subsystem to: determine whether the materials handling vehicle is approaching, or has arrived at, a potentially contested intersection; associate with the intersection pre-positioned warehouse object data, a set of road rules, and obstacle data; and navigate the materials handling vehicle through the intersection utilizing warehouse navigation maneuvers in combination with the associated set of road rules, obstacle avoidance maneuvers, or both, the warehouse navigation maneuvers accounting for the associated pre-positioned warehouse object data and the obstacle avoidance maneuvers accounting for the obstacle data derived from the obstacle detection subsystem.

20 Claims, 19 Drawing Sheets

Related U.S. Application Data

(60) Provisional application No. 62/537,981, filed on Jul. 28, 2017.

(51) Int. Cl.
   *G01C 21/20* (2006.01)
   *G05D 1/00* (2006.01)

(52) U.S. Cl.
   CPC ............ *G08G 1/162* (2013.01); *G08G 1/166* (2013.01); *G05D 2201/0216* (2013.01)

(56) References Cited

U.S. PATENT DOCUMENTS

| | | | | |
|---|---|---|---|---|
| 8,965,561 | B2* | 2/2015 | Jacobus | G05D 1/0274 700/216 |
| 9,174,830 | B1* | 11/2015 | Bell | B66F 9/0755 |
| 9,327,397 | B1* | 5/2016 | Williams | B25J 3/04 |
| 9,340,399 | B2 | 5/2016 | Bell | |
| 9,349,181 | B2 | 5/2016 | Chandrasekar et al. | |
| 9,618,932 | B2* | 4/2017 | Hess | B66F 9/063 |
| 9,633,560 | B1* | 4/2017 | Gao | G08G 1/0145 |
| 9,811,088 | B2* | 11/2017 | Walton | G05D 1/0261 |
| 9,958,873 | B2* | 5/2018 | Thomson | G05D 1/0274 |
| 9,990,535 | B2* | 6/2018 | Phillips | G06K 9/6202 |
| 10,017,322 | B2* | 7/2018 | High | B66F 9/0755 |
| 10,138,101 | B2* | 11/2018 | Svensson | H04N 13/204 |
| 10,155,646 | B2* | 12/2018 | Lee | B66F 9/24 |
| 10,310,499 | B1* | 6/2019 | Brady | G06Q 10/087 |
| 10,346,794 | B2* | 7/2019 | High | G06F 16/5854 |
| 10,346,797 | B2* | 7/2019 | Jacobus | G05D 1/0234 |
| 10,351,399 | B2* | 7/2019 | High | B60L 53/63 |
| 10,351,400 | B2* | 7/2019 | High | B62B 5/0026 |
| 10,559,207 | B1* | 2/2020 | Reed | G08G 1/07 |
| 2004/0158355 | A1* | 8/2004 | Holmqvist | G05D 1/0274 700/245 |
| 2009/0256721 | A1* | 10/2009 | Glatfelter | G08G 1/07 340/907 |
| 2010/0266381 | A1* | 10/2010 | Chilson | G01C 22/00 414/809 |
| 2011/0046813 | A1* | 2/2011 | Castaneda | G05D 1/0033 701/2 |
| 2011/0093134 | A1* | 4/2011 | Emanuel | G05D 1/0297 701/2 |
| 2013/0338854 | A1* | 12/2013 | Yamamoto | G05D 1/0022 701/2 |
| 2014/0058634 | A1* | 2/2014 | Wong | G01S 17/86 701/50 |
| 2014/0277691 | A1* | 9/2014 | Jacobus | B66F 9/063 700/216 |
| 2015/0202770 | A1* | 7/2015 | Patron | G06Q 20/386 700/245 |
| 2015/0379704 | A1* | 12/2015 | Chandrasekar | G06T 7/70 701/25 |
| 2016/0180713 | A1* | 6/2016 | Bernhardt | B66F 17/003 701/70 |
| 2017/0124476 | A1* | 5/2017 | Levinson | G01S 17/86 |
| 2017/0221366 | A1* | 8/2017 | An | G08G 1/096783 |
| 2017/0329337 | A1* | 11/2017 | Kusano | G08G 1/09675 |
| 2018/0090001 | A1* | 3/2018 | Fletcher | B60W 20/12 |
| 2018/0341274 | A1* | 11/2018 | Donnelly | H04W 4/46 |
| 2018/0357601 | A1* | 12/2018 | Jacobus | B66F 9/063 |
| 2020/0264633 | A1* | 8/2020 | Collett | G05D 1/0289 |

FOREIGN PATENT DOCUMENTS

| | | |
|---|---|---|
| JP | H0935179 | 2/1997 |
| JP | 2003099887 | 4/2003 |
| JP | 5378188 | 12/2013 |
| KR | 101734997 | 6/2017 |

OTHER PUBLICATIONS

Office Action dated Dec. 14, 2020 pertaining to Chinese Patent Application No. 201880059720.1.

* cited by examiner

TRAFFIC MANAGEMENT FOR MATERIALS HANDLING VEHICLES IN A WAREHOUSE ENVIRONMENT

CROSS-REFERENCE TO RELATED APPLICATIONS

This application is a continuation of U.S. Non-Provisional application Ser. No. 16/046,400 (CRNZ 1627 PA), filed Jul. 26, 2018, which claims the benefit of U.S. Provisional Application Ser. No. 62/537,981 (CRNZ 1627 MA) filed Jul. 28, 2017, the entireties of which are incorporated by reference herein.

BACKGROUND

The present disclosure generally relates to systems and methods for traffic management, and, more specifically, to systems and methods for traffic management in a warehouse environment between manual, semi-autonomous, and/or autonomous materials handling vehicles.

BRIEF SUMMARY

In accordance with one embodiment of the present disclosure, a materials handling vehicle is provided, and comprises an obstacle detection subsystem and a navigation subsystem. The navigation subsystem is configured to cooperate with the traction control unit, the braking system, the steering assembly, and the obstacle detection subsystem of the vehicle to: determine whether the materials handling vehicle is approaching, or has arrived at, a potentially contested intersection; associate pre-positioned warehouse object data derived from a database of pre-positioned warehouse objects in the warehouse environment with the potentially contested intersection; associate a set of road rules with the potentially contested intersection; and associate obstacle data derived from the obstacle detection subsystem with the potentially contested intersection. The navigation subsystem is further configured to cooperate with the traction control unit, the braking system, the steering assembly, and the obstacle detection subsystem to navigate the materials handling vehicle through the potentially contested intersection utilizing warehouse navigation maneuvers in combination with the associated set of road rules, obstacle avoidance maneuvers, or both. The warehouse navigation maneuvers account for the associated pre-positioned warehouse object data and the obstacle avoidance maneuvers account for the obstacle data derived from the obstacle detection subsystem.

In accordance with another embodiment of the present disclosure, a system comprising a remote terminal and a materials handling vehicle is provided. The materials handling vehicle comprises an obstacle detection subsystem and a navigation subsystem that is configured to communicate with the remote terminal. The remote terminal is configured to maintain the database of pre-positioned warehouse objects.

In accordance with yet another embodiment of the present disclosure, a method of navigating a materials handling vehicle with respect to a vehicle transit surface in a warehouse environment is provided. According to the method, the navigation subsystem of the materials handling vehicle is used to determine whether the materials handling vehicle is approaching, or has arrived at, a potentially contested intersection. Pre-positioned warehouse object data, a set of road rules, and obstacle data are associated with the potentially contested intersection. The method further comprises navigating the materials handling vehicle through the potentially contested intersection utilizing warehouse navigation maneuvers in combination with the associated set of road rules, obstacle avoidance maneuvers, or both.

In accordance with yet one other embodiment of the present disclosure, a traffic management system is provided comprising a remote or local traffic management server configured to grant permission to submitted vehicle requests to proceed through an intersection based on clearance of prior submitted requests and corresponding exit notifications.

These and additional features provided by the embodiments described herein will be more fully understood in view of the following detailed description, in conjunction with the drawings.

BRIEF DESCRIPTION OF THE SEVERAL VIEWS OF THE DRAWINGS

The embodiments set forth in the drawings are illustrative and exemplary in nature and are not intended to limit the subject matter defined by the claims. The following detailed description of specific embodiments of the present disclosure can be best understood when read in conjunction with the following drawings, where like structure is indicated with like reference numerals and in which:

DETAILED DESCRIPTION

Figure 1A:
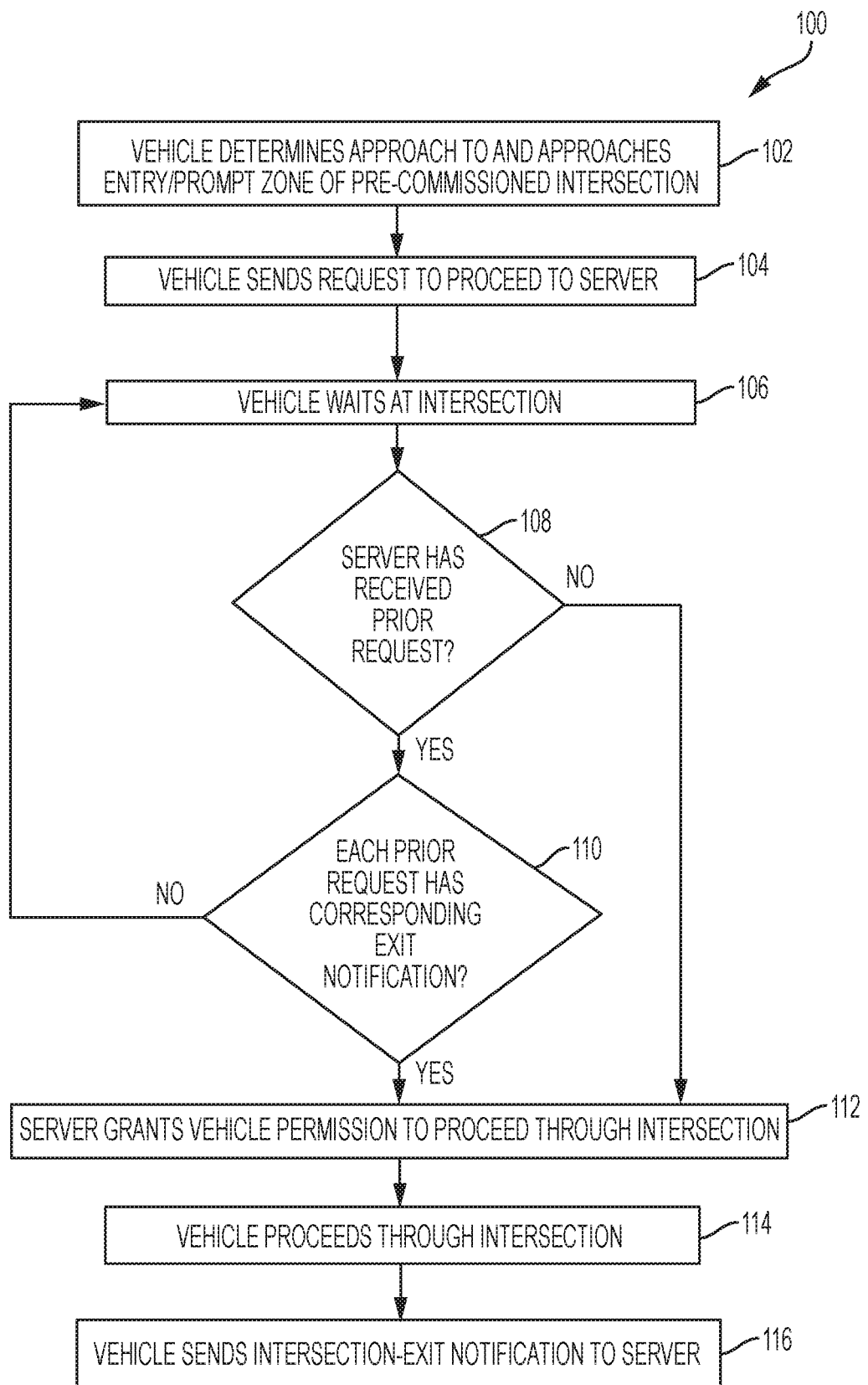
FIG. 1A schematically illustrates an implementation process for a remotely mediated embodiment, according to one or more embodiments shown and described herein.

The present disclosure provides processes and systems configured to assist with traffic management of materials handling vehicles in a warehouse environment. For example, the present disclosure provides traffic flow solutions at controlled or contention areas such as intersections or contention points in shared warehouse regions to ensure free flow of traffic within such areas. A controlled area such as an intersection may be defined as an area of contention where access should be limited based on the presence of other materials handling vehicles. Multiple semi-autonomous and/or autonomous materials handling vehicles may need to give way to each other, or to manual drivers, to allow free flowing traffic and prevent deadlock at the contention areas. Contention areas, such as intersections, may be encoded as part of zones that may include, for example, one or more entry/prompt zones of pre-commissioned intersections.

Materials handling vehicles described herein may interact with other automated or semi-automated materials handling vehicles, manually driven materials handling vehicles, non-vehicular obstacles, such as, for example, loaded or unloaded warehouse pallets, debris, pedestrians, and other obstacles that would potentially obstruct traffic flow in a warehouse environment, and pre-positioned warehouse objects, such as, for example warehouse racking features, warehouse hardware defining warehouse aisles, or other warehouse infrastructure (arms, lifts, doors and/or other traffic controls). Material handling vehicles described herein may be tugger-type vehicles such as tugger automated guided vehicles, which may be configured to tug a chain of carts, and/or lift trucks as available from Crown Equipment Corporation such as, for example, SP Series Order Pickers such as the Crown SP 3500/4500 Series Order Picker and/or TSP Turret Trucks such as one of the TSP 7000 VNA Truck Series. The materials handling vehicles described herein may incorporated automated guidance vehicle (AGV) functionality using, for example, wire guidance or other guidance features for AGV positioning functionality such as radio-frequency identification (RFID) tags. For example, RFID tags may be disposed throughout a warehouse environment to act as active or passive transponders communicating with the materials handling vehicles and/or one or more networks to assist with vehicle tracking, navigation, and traffic management through the warehouse environment.

In embodiments, an automated or semi-automated vehicle system will be designed such that a materials handling vehicle will be configured to stop before colliding with other materials handling vehicles. Vehicle traffic issues with other materials handling vehicles may include delays and/or deadlocks, which may be classified as a situation requiring a manual operator to resolve. The embodiments described herein provide one or more implementation processes and systems for traffic management of materials handling vehicles in a warehouse environment to avoid and/or prevent such traffic issues.

In embodiments, a traffic management system comprises a remote or local traffic management server configured to grant permission to submitted vehicle requests to proceed through an intersection based on clearance of prior submitted requests and corresponding exit notifications. By way of example and not as a limitation, and as described in greater detail below, a traffic management system comprises control architecture comprising one or more architecture controllers programmed to: receive through a traffic management server a request from a navigation module of a mediated vehicle to proceed through an intersection within the multivehicle warehouse; determine whether the traffic management server has received one or more prior requests from one or more of the plurality of materials handling vehicles to proceed through the intersection; and determine whether the one or more prior requests to proceed through the intersection comprise corresponding exit notifications that are indicative of progress through and exit from the intersection in response to a determination that the traffic management server has received one or more prior requests to proceed through the intersection. The one or more architecture controllers may further be programmed to: transmit through the traffic management server permission to proceed through the intersection to the navigation module of the mediated vehicle in response to a determination that the traffic management server has not received one or more prior requests to proceed through the intersection, or in response to the determination that the traffic management server has received one or more prior requests to proceed through the intersection comprising corresponding exit notifications.

I. Remotely Mediated Embodiment

In a remotely mediated embodiment, a centralized server is used to track the state of contention areas (such as intersections). Each contention area may be associated with a unique identifier. When an autonomous or semi-autonomous materials handling vehicle (such as a truck or forklift) approaches an intersection, the materials handling vehicle may announce that approach to the server via a reference to the unique identifier associated with the intersection. The materials handling vehicle may request permission to enter the intersection from the server. If no other materials handling vehicle is in the intersection, the server will grant permission, and other materials handling vehicles will be denied and requested to wait until the current materials handling vehicle leaves the intersection. The materials handling vehicle will enter and proceed through the intersection and notify the server when the materials handling vehicle, including any associated components such as attached carts, is clear of the intersection.

Alternatively, if there are one or more other materials handling vehicles in the intersection when the materials handling vehicle requests permission to enter the intersection from the server, the server sends back a wait request to the materials handling vehicle. The materials handling vehicle may re-request permission to enter the intersection after a period of time such as, for example, after between 5 seconds to about 10 seconds. If the intersection remains occupied for more than a certain amount of time, such as one minute, then the server may create an alert indicating that a manual examination of the situation at the intersection may be needed. A supervisor may then be dispatched to the intersection to clear the intersection state. Information regarding the cleared state may be provided to the server.

The remotely mediated embodiment may be implemented through an implementation process, such as one described in greater detail further below with respect to FIG. 1A, and may include one or more remote servers to assist with basic free flow at intersections or contention points to provide deadlock free operation. For example, a failure of the intersection management may lead to a deadlock between multiple materials handling vehicles and may require manual intervention to resolve. The remotely mediated embodiment may be utilized to assist with preventing a number of such traffic situations that would arise. For example, contention areas such as bi-directional single lane zones and the like (described in greater detail further below) may be managed through the remotely mediated embodiment. Intersection constraints followed by the remotely mediated embodiment (and others embodiments described herein) may include, for example, a rule to only have a single materials handling vehicle allowed in a controlled area at a time and/or a rule to guarantee an exit route from a controlled area for a materials handling vehicle.

In embodiments, the server may not comprise information regarding the controlled area and/or may be configured to learn and store such information (such as an associated unique identifier) based on materials handling vehicle requests. In embodiments, the server may not have any global path knowledge and/or provide any control of driven path. The server may not have knowledge of materials handling vehicles in an area around an intersection other than of those materials handling vehicles that have communicated with the server and are waiting for access to that intersection. Further, contention areas, such as intersections, may be predefined in the site data on board a materials handling vehicle, in the site data on the server, and/or inferred from materials handling vehicle communications. For example, a materials handling vehicle may initiate communication with the server and convey all information needed to manage the intersection. Thus, when a materials handling vehicle is in the intersection, the materials handling vehicle is not required to depend on another materials handling vehicle moving before the materials handling vehicle can exit the intersection as the materials handling vehicle should only have been granted access by the system to a cleared intersection with a guaranteed exit route. The materials handling vehicle may notify the server when the materials handling vehicle exits the intersection.

In some remotely mediated embodiments, an implementation process may include a server tracking a persistent state of all controlled, contention areas (such as intersections), each of which may have a unique identifier. The server may not have information regarding the physical dimensions of controlled areas and may potentially start with no information regarding controlled areas. The server may be configured to learn about the controlled areas (such as associated location information, a unique identifier, and the like) based on materials handling vehicle requests. In the implementation process, a materials handling vehicle may announce when the materials handling vehicle is approaching a controlled area through reference to a unique identifier that is associated with the controlled area and may request permission to enter from the server. The server may either reply "OK" or "WAIT" depending on area state. If requested to wait, the materials handling vehicle may re-request after a time period (such as 5 seconds). If an OK reply is received from the server, then the materials handling vehicle may proceed through the intersection and notify the server when the materials handling vehicle (and all materials handling vehicle components such as any attached carts) is clear of the controlled area. If the controlled area remains occupied for more than a certain time (such as 1 minute), the server may create an alert providing a notification that a supervisor should be dispatched to manually examine the situation. The supervisor may be able to manually clear the intersection state from a graphical user interface (GUI) of the server.

Referring to FIG. 1A, for example, an implementation process 100 for a remotely mediated embodiment may comprise a step 102 in which the materials handling vehicle determines an approach to and approaches a controlled area such as an entry/prompt zone of a pre-commissioned intersection. Referring to FIG. 2, an example application 250 may be applied with the implementation process 100 of FIG. 1A. FIG. 2 illustrates a mediated materials handling vehicle 400 approaching an intersection zone 258 along the path of an arrow 264. The example application 250 may further be utilized with respect to an implementation process 200 of FIG. 1B, which is described in greater detail further below.

Referring back to FIG. 1A, in a following step 104, the materials handling vehicle sends a request to proceed through the intersection to a server. Referring again to FIG. 2, the mediated materials handling vehicle 400 approaches a trigger point 252 at an initial boundary of an entry/prompt zone 254. At the trigger point 252, the mediated materials handling vehicle 400 sends a request to proceed to the server. In step 106 (FIG. 1A), the materials handling vehicle waits at the intersection and, in step 108, the system determines if the server has received prior requests. If not, in step 112, the server grants the materials handling vehicle permission to proceed through the intersection. Thus, the server grants the materials handling vehicle permission to proceed through the intersection based on a determination that the server has not received prior requests.

If, however, the server has received prior requests, the system in step 110 determines whether each prior request has a corresponding exit notification. Thus, based on a determination that the server has received prior requests, the server determines whether each prior request has a corresponding exit notification. If so, the server grants the materials handling vehicle permission to proceed through the intersection in step 112. Thus, the server grants the materials handling vehicle permission to proceed through the intersection based on a determination that each prior request has a corresponding exit notification.

If not, the materials handling vehicle continues to wait at the intersection in step 106 until either the system determines that the server does not have any other prior requests in step 108 or that each prior request has a corresponding exit notification in step 110. Thus, the server does not grant the materials handling vehicle permission to proceed through the intersection such that the materials handling vehicle continues to wait at the intersection based on a determination that each prior request does not have a corresponding exit notification. The materials handling vehicle will continue to wait until a first determination point that the server does not have any prior requests or a second determination point that each prior request has a corresponding exit notification is reached. At either determination point, the server may then grant the materials handling vehicle permission to proceed through the intersection in step 112.

In step 114, the materials handling vehicle proceeds through the intersection when granted permission. Referring to FIG. 2, to proceed past the point 256 at an opposing end of the entry/prompt zone 254, the mediated materials handling vehicle 400 must have received clearance to pass from the server. In step 116, the materials handling vehicle sends an intersection-exit notification to the server. For example, after receiving clearance to pass, the mediated materials handling vehicle 400 may then pass through the intersection zone 258 to reach an exit notification point 260 at an initial boundary of an exit zone 262, at which point the mediated materials handling vehicle 400 sends the intersection-exist notification to the server.

In embodiments, limitations based on traffic rules may also generally imply restrictions on how a warehouse environment is laid out and operated. For example, application of simple traffic rules may only work for a very narrow aisle (VNA) facility if the VNA facility is laid out and operated in a serpentine fashion.

With respect to the remotely mediated embodiments, a fully coordinated traffic management system may utilize one or more servers responsible for coordinating a fleet of autonomous materials handling vehicles. For example, a large VNA area with a rule based traffic manager would likely require serpentine paths through the aisles, whereas a fully-managed warehouse may be laid out and operate to allow multiple materials handling vehicles in an aisle travelling in different directions. For tugger-type scenarios, this connectivity may enable better performance in congested areas. For manual materials handling vehicles, basic adjustments could be made based on congestion or predicted motion. The server in these scenarios may still be able to run smart traffic lights (as described in greater detail below) or give an all clear for intersections for which a materials handling vehicle would otherwise slow down such that the materials handling vehicle may proceed through the intersection without slowing down.

In an embodiment, an implementation process for a remotely mediated embodiment comprises a step in which a materials handling vehicle determines an approach to and approaches a controlled area such as an entry/prompt zone of a pre-commissioned intersection. In a following step, the materials handling vehicle sends a request to proceed through the intersection to a server. The materials handling vehicle waits at the intersection and the system determines if the server has received prior requests. If not, the server grants the materials handling vehicle permission to proceed through the intersection. If, however, the server has received prior requests, the system determines whether each prior request has a corresponding exit notification. If so, the server grants the materials handling vehicle permission to proceed through the intersection. If not, the materials handling vehicle continues to wait at the intersection until either the system determines that the server does not have any other prior requests or that each prior request has a corresponding exit notification. At either determination point, the server may then grant the materials handling vehicle permission to proceed through the intersection. The materials handling vehicle proceeds through the intersection when granted permission, and the materials handling vehicle sends an intersection-exit notification to the server.

II. Locally Mediated Embodiment

In a locally mediated embodiment, a materials handling vehicle requests clearance of an intersection through use of a local mediator, rather than through a remote request to a central server as implemented in the remotely mediated embodiment described above. In embodiments, the local mediator may be, for example, a smart traffic light with an embedded computer, connected via a short range wireless technology (such as zigbee, Bluetooth, z-wave, and the like).

Figure 1B:
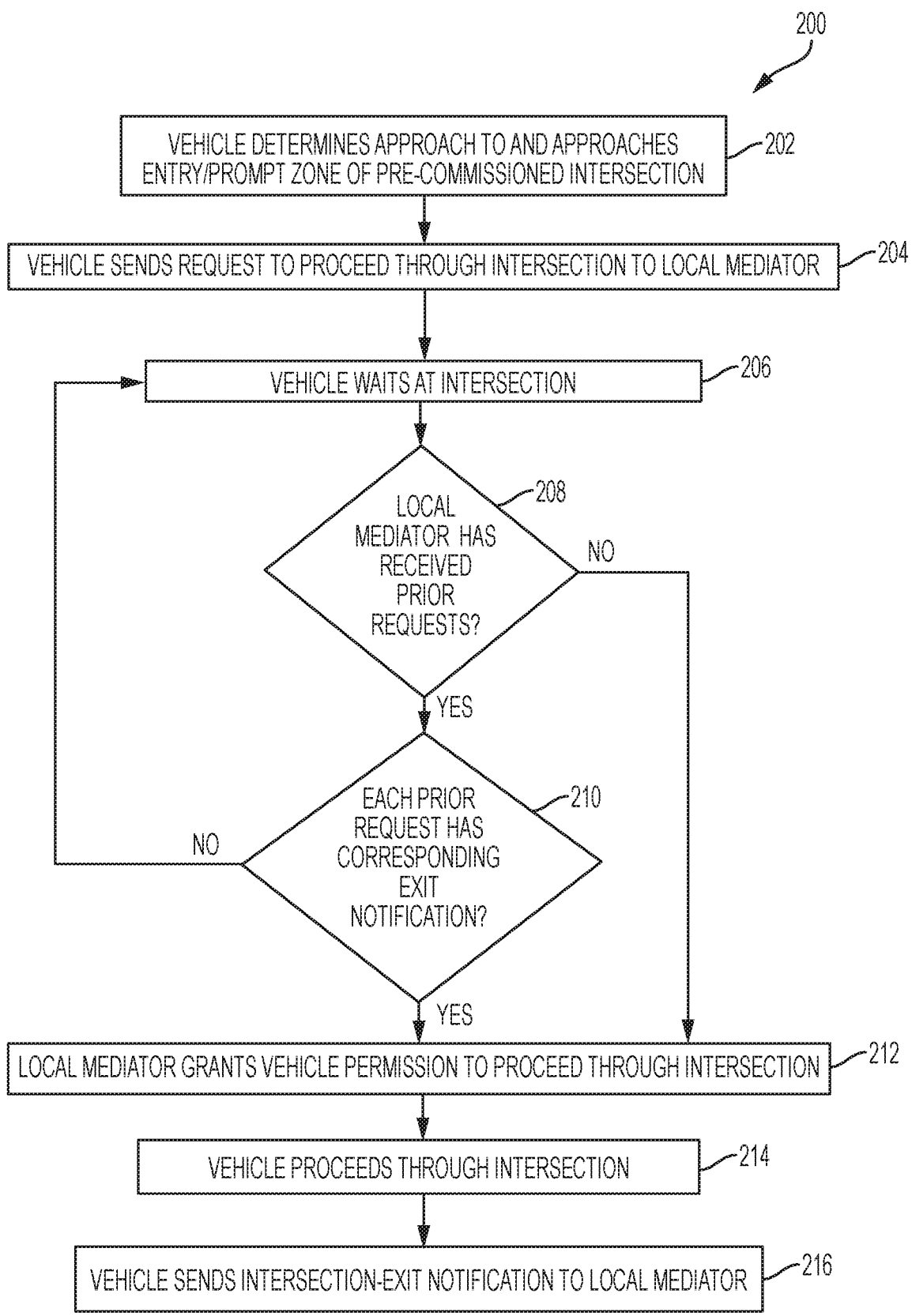
FIG. 1B schematically illustrates an implementation process for a locally mediated embodiment, according to one or more embodiments shown and described herein.
Figure 2:
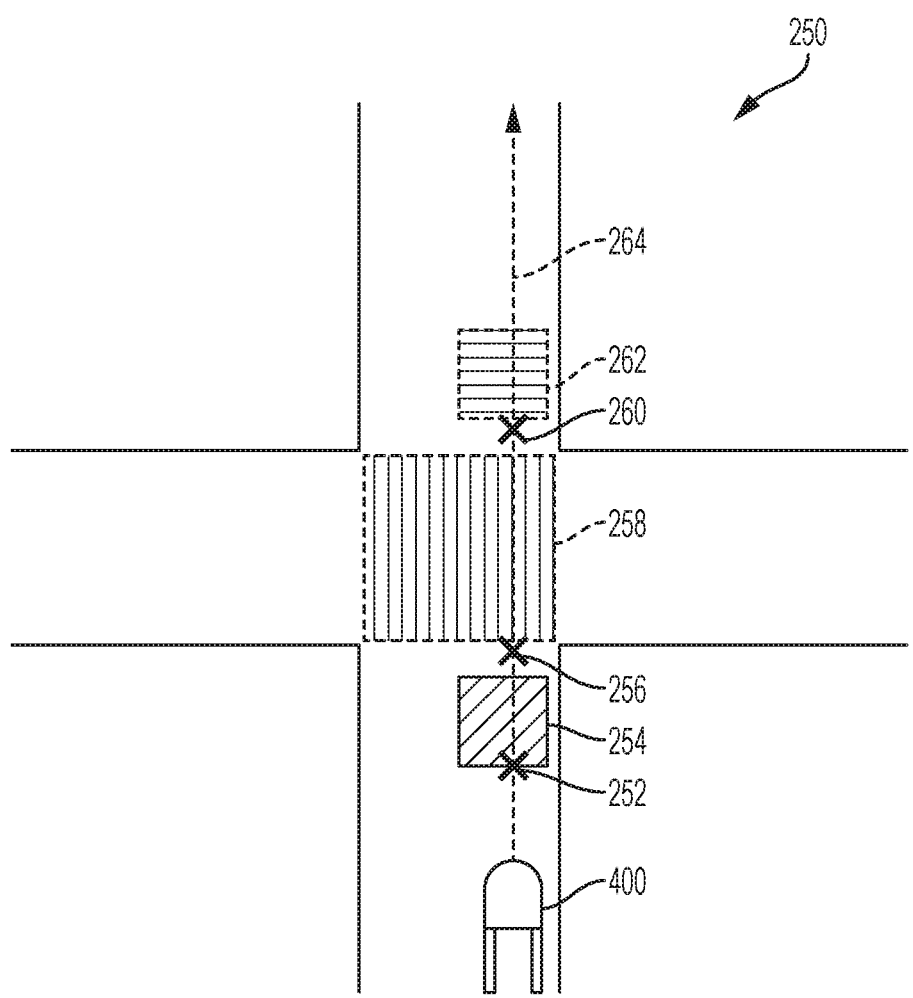
FIG. 2 schematically illustrates an example of the implementation process of FIG. 1A or 1B as applied to a mediated materials handling vehicle approaching an intersection, according to one or more embodiments shown and described herein.

Referring to FIG. 1B, an implementation process 200 for a locally mediated embodiment may comprise a step 202 in which the materials handling vehicle determines an approach to and approaches a controlled area such as an entry/prompt zone of a pre-commissioned intersection. Referring to FIG. 2, the example application 250 may be applied with the implementation process 200 of FIG. 1B. For example, FIG. 2 illustrates a mediated materials handling vehicle 400 that may be using the implementation process 200 of FIG. 1B approaching an intersection zone 258 along the path of an arrow 264.

Referring back to FIG. 1B, in a following step 204, the materials handling vehicle sends a request to proceed through the intersection to a local mediator as described herein. Referring again to FIG. 2, the mediated materials handling vehicle 400 approaches a trigger point 252 at an initial boundary of an entry/prompt zone 254. At the trigger point 252, the mediated materials handling vehicle 400 sends a request to proceed to the local mediator. In step 206 (FIG. 1B), the materials handling vehicle waits at the intersection. In step 208, the system determines if the local mediator has received prior requests. If not, in step 212, the local mediator grants the materials handling vehicle permission to proceed through the intersection. Thus, the local mediator grants the materials handling vehicle permission to proceed through the intersection based on a determination that the local mediator has not received prior requests.

If, however, the local mediator has received prior requests, the system in step 210 determines whether each prior request has a corresponding exit notification. Thus, based on a determination that the local mediator has received prior requests, the local mediator determines whether each prior request has a corresponding exit notification. If so, the local mediator grants the materials handling vehicle permission to proceed through the intersection in step 212. Thus, the local mediator grants the materials handling vehicle permission to proceed through the intersection based on a determination that each prior request has a corresponding exit notification.

If not, the materials handling vehicle continues to wait at the intersection in step 206 until either the system determines that the local mediator does not have any other prior requests in step 208 or that each prior request has a corresponding exit notification in step 210. Thus, the local mediator does not grant the materials handling vehicle permission to proceed through the intersection such that the materials handling vehicle continues to wait at the intersection based on a determination that each prior request does not have a corresponding exit notification. The materials handling vehicle will continue to wait until a first determination point that the local mediator does not have any prior requests or a second determination point that each prior request has a corresponding exit notification is reached. At either determination point, the local mediator may then grant the materials handling vehicle permission to proceed through the intersection in step 212.

In step 214, the materials handling vehicle proceeds through the intersection when granted permission. Referring to FIG. 2, to proceed past the point 256 at an opposing end of the entry/prompt zone 254, the mediated materials handling vehicle 400 must have received clearance to pass from the local mediator. In step 216, the materials handling vehicle sends an intersection-exit notification to the local mediator. For example, after receiving clearance to pass, the mediated materials handling vehicle 400 may then pass through the intersection zone 258 to reach an exit notification point 260 at an initial boundary of an exit zone 262, at which point the mediated materials handling vehicle 400 sends an intersection-exist notification to the local mediator.

In an embodiment, an implementation process for a locally mediated embodiment comprises a step in which a materials handling vehicle determines an approach to and approaches a controlled area such as an entry/prompt zone of a pre-commissioned intersection. In a following step, the materials handling vehicle sends a request to proceed through the intersection to a local mediator as described herein. The materials handling vehicle waits at the intersection. The system determines if the local mediator has received prior requests. If not, the local mediator grants the materials handling vehicle permission to proceed through the intersection. If, however, the local mediator has received prior requests, the system determines whether each prior request has a corresponding exit notification. If so, the server grants the materials handling vehicle permission to proceed through the intersection. If not, the materials handling vehicle continues to wait at the intersection until either the system determines that the local mediator does not have any other prior requests or that each prior request has a corresponding exit notification. At either determination point, the local mediator may then grant the materials handling vehicle permission to proceed through the intersection. The materials handling vehicle proceeds through the intersection when granted permission, and the materials handling vehicle sends an intersection-exit notification to the local mediator.

III. Vehicle-Sensor Mediated Embodiment

In yet another embodiment, materials handling vehicles feature local sensor data (such as laser scan data) to determine when to proceed into an intersection. The determination may be based on local obstacle detection and traffic rules. When the materials handling vehicle approaches the intersection, zone data will determine which of the one or more zones (i.e., zone(s)) defining a give way region of an intersection must be clear before the materials handling vehicle may enter the intersection. A priority ordering may be created and used that is similar to traditional local road rules (e.g., a yield would require that the left (or right) zones of the intersection that define the give way region are clear before entering the intersection, whereas a stop would require that all zones of the intersection that define the give way region are clear).

The give way region particular to an intersection following road rules associated with the intersection may be constructed from intersection zone data. The materials handling vehicle then uses sensor data (such as laser scan data generated through a sensor comprising a 2D laser scanner, for example) to ensure these regions are clear before entering the intersection. Such a laser based approach may allow for decentralized implementation, as well as detection of manually driven materials handling vehicles. Obstacle detection through the laser scanner may scan an area surrounding a materials handling vehicle as it proceeds through an intersection, such as materials handling vehicles entered from an opposite side of the intersection. In embodiments, the intersection may have a reduced speed limit such that materials handling vehicles proceeding through the intersection adjust speed to be at or below the reduced speed limit.

In embodiments, a materials handling vehicle may be able to determine a presence of another materials handling vehicle in an intersection but not the state of the other materials handling vehicle in the intersection, and the materials handling vehicle may not be able to affect the state of other materials handling vehicles. In embodiments, the materials handling vehicle and/or local network may not have prior knowledge of materials handling vehicle locations. Obstacle detection may be implemented in a system running on materials handling vehicles such that the system is configured to slow a respective materials handling vehicle upon such obstacle detection before any laser safety fields are infringed, which minimizes human intervention and emergency stops.

Vehicle-sensor mediated embodiments may run online with respect to a system on the materials handling vehicle, may feature real time performance, and may be deployed through a local network within a short distance range of an intersection. Intersection constraints followed by the vehicle-sensor mediated embodiment may include, for example, a rule to only have a single materials handling vehicle allowed in a controlled area at a time and/or a rule to guarantee an exit route from a controlled area for a materials handling vehicle.

Vehicle-sensor mediated embodiments may be applied to autonomous, semi-autonomous, and/or manual materials handling vehicles that follow the same rule set. In vehicle-sensor mediated embodiments, the materials handling vehicle is responsible for local isolated resolution of right of way. Obstacle detection may be used to identify other materials handling vehicles at the intersection point, and then simple local road rules, such as "give way to the right" or "give way to all traffic" may be used to decide behavior. In embodiments, the implementation may be a purely local implementation that features obstacle detection and potentially features an accurate map of fixed infrastructure obstacles. One or more of the materials handling vehicles may be configured to store one or more warehouse maps including, for example, information regarding locations of such fixed obstacles in the warehouse environment.

Continuing with the vehicle-sensor mediated embodiments, in an implementation process, such as one described below in greater detail with respect to FIG. 3A, a materials handling vehicle may enter an intersection by determining an approach to, approaching, and entering an intersection-approach zone. The materials handling vehicle may establish map positions of the intersection and other approach zones. As an example and not by way of limitation, commissioning tools for a zone map or rule set may have local road rules (e.g., giving way to the right/left) encoded in order to assist in construction of the map. In embodiments, the materials handling vehicle may plan a stop point and begin slowing when approaching the stop point. At the stop point, the materials handling vehicle may check if the zones are clear through obstacle detection conducted through the laser scanner. If the zones are clear, the materials handling vehicle may proceed up to the speed limit associated with the intersection and/or set by materials handling vehicle rules or local road rules. If the approach zones are infringed such that the one or more zones defining a give way region are not clear, the materials handling vehicle may apply local road rules with respect to the give way region of the intersection. In embodiments, if the materials handling vehicle has a right of way, the materials handling vehicle may proceed into the intersection up to the intersection speed limit. If the field of view of the laser scanner is infringed and detects an obstacle, or if the laser scanner generates an obstructed view, the materials handling vehicle may stop at a predetermined point and wait for an intersection zone to be clear before reapplying the local road rules.

Figure 3A:
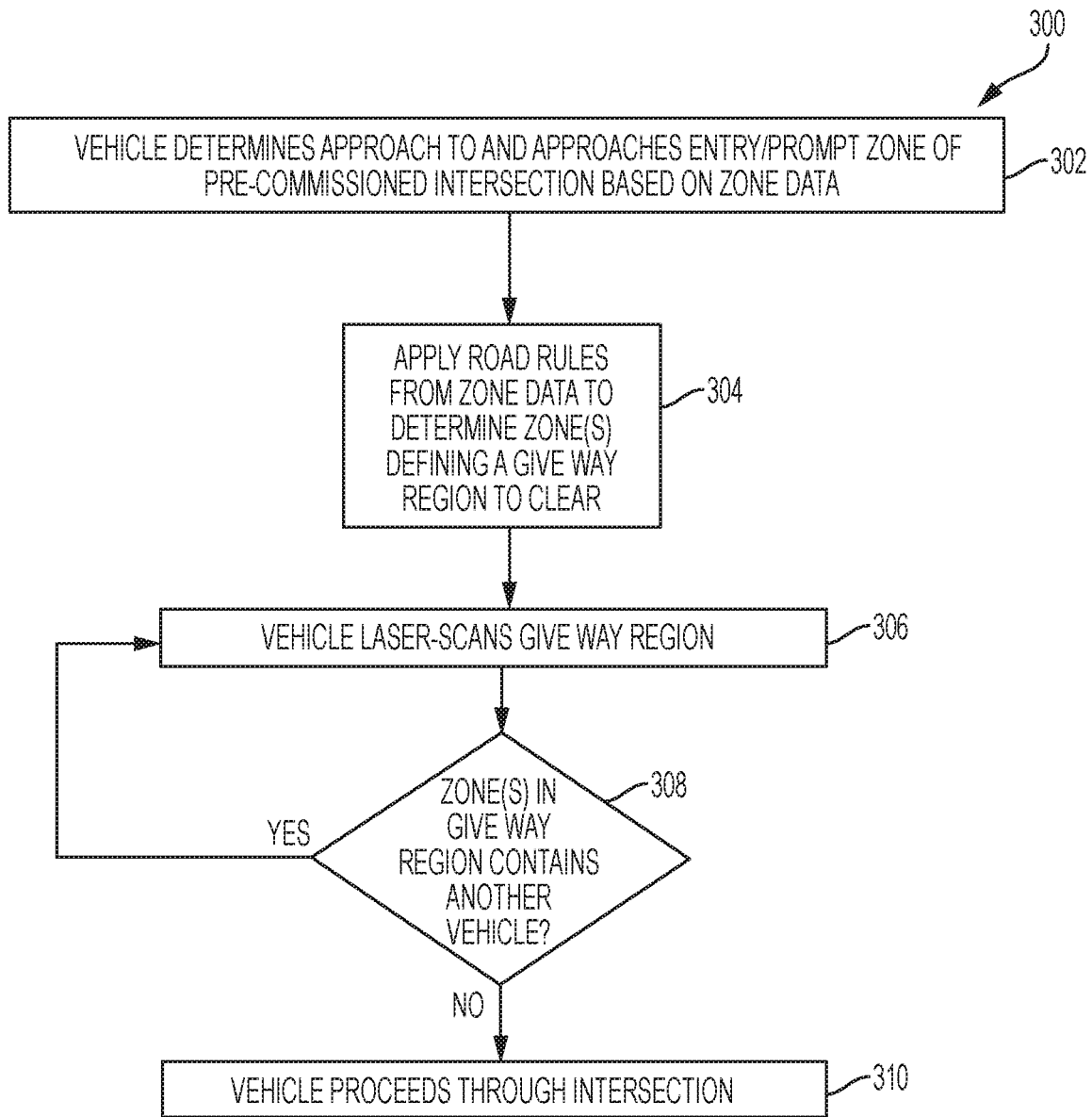
FIG. 3A schematically illustrates an implementation process for a materials handling vehicle-sensor mediated embodiment, according to one or more embodiments shown and described herein.

Referring to FIG. 3A, an implementation process 300 for a vehicle-sensor mediated embodiment may comprise a step 302 in which the materials handling vehicle determines an approach to and approaches a controlled area such as an entry/prompt zone of a pre-commissioned intersection. Referring to FIG. 3C, an example application 270A may be applied with the implementation process 300 of FIG. 3A. FIG. 3C illustrates a mediated materials handling vehicle 400 approaching an intersection zone along the path of an arrow 282A. Similarly, referring to FIGS. 3D, 3E, and 3F, example applications 270B, 270C, and 270D may be applied with the implementation process 300 of FIG. 3A, where FIGS. 3D, 3E, and 3F respectively illustrate a mediated materials handling vehicle 400 approaching an intersection zone along the path of an arrow 282B, 282C, and 282D associated with respective path projected headings 280B, 280C, and 280D. As a non-limiting example, FIG. 3C illustrates a mediated materials handling vehicle 400 approaching an intersection zone along the path of an arrow 282A associated with straight cross path projected heading 280A. FIG. 3D illustrates a mediated materials handling vehicle 400 approaching an intersection zone along the path of an arrow 282B associated with right turn path projected heading 280B. FIG. 3E illustrates a mediated materials handling vehicle 400 approaching an intersection zone along the path of an arrow 282C associated with straight cross path projected heading 280C. FIG. 3F illustrates a mediated materials handling vehicle 400 approaching an intersection zone along the path of an arrow 282D associated with right turn path projected heading 280D.

Referring back to FIG. 3A, in a following step 304, road rules may be applied to the intersection as described herein from zone data to determine the one or more zones (i.e., zone(s)) defining a give way region to clear in the intersection. As an example, and as described above, a yield would require that the left (or right) zones of the intersection that define the give way region are clear before entering the intersection. However, a stop would require that all zones of the intersection that define the give way region are clear.

Thus, in the next step 306, the materials handling vehicle laser-scans the give way region. For example, referring to FIG. 3C, the mediated materials handling vehicle 400 approaches a trigger point 272 of an initial boundary of an entry zone 274, with an exit boundary of the entry zone 274 defined by an entry zone exit point 276, scans a give way region 278A, applies obstacle detection rules to a path 280A along the arrow 282A in the give way region 278A, and only proceeds into the give way region 278A of the intersection if the give way region 278A is determined to be clear.

For example, after such scanning, in step 308 (FIG. 3A), a determination is made as to whether the zone(s) defining the give way region contain another materials handling vehicle such that the zone(s) are not clear. If so, the materials handling vehicle proceeds to continue to scan the give way region 278A in step 306 and wait until the zone(s) are clear. Thus, materials handling vehicle proceeds to continue to scan the give way region based on a determination that the zone(s) defining the give way region contain another materials handling vehicle such that the zone(s) are not clear. If not, and the zone(s) are clear, then in step 310 the materials handling vehicle proceeds through the intersection. Thus, the materials handling vehicle proceeds through the intersection based on a determination that the zone(s) defining the give way region 278A do not contain another materials handling vehicle such that the zone(s) are clear.

Some embodiments may leverage zones to define intersection and approach zones. Further, some embodiments may support local road rules comprising left and right hand give way rules, and may include a hierarchy of stop and give way rules. Further, in some embodiments, a materials handling vehicle may stop for another materials handling vehicle that cannot stop in time.

Figure 3B:
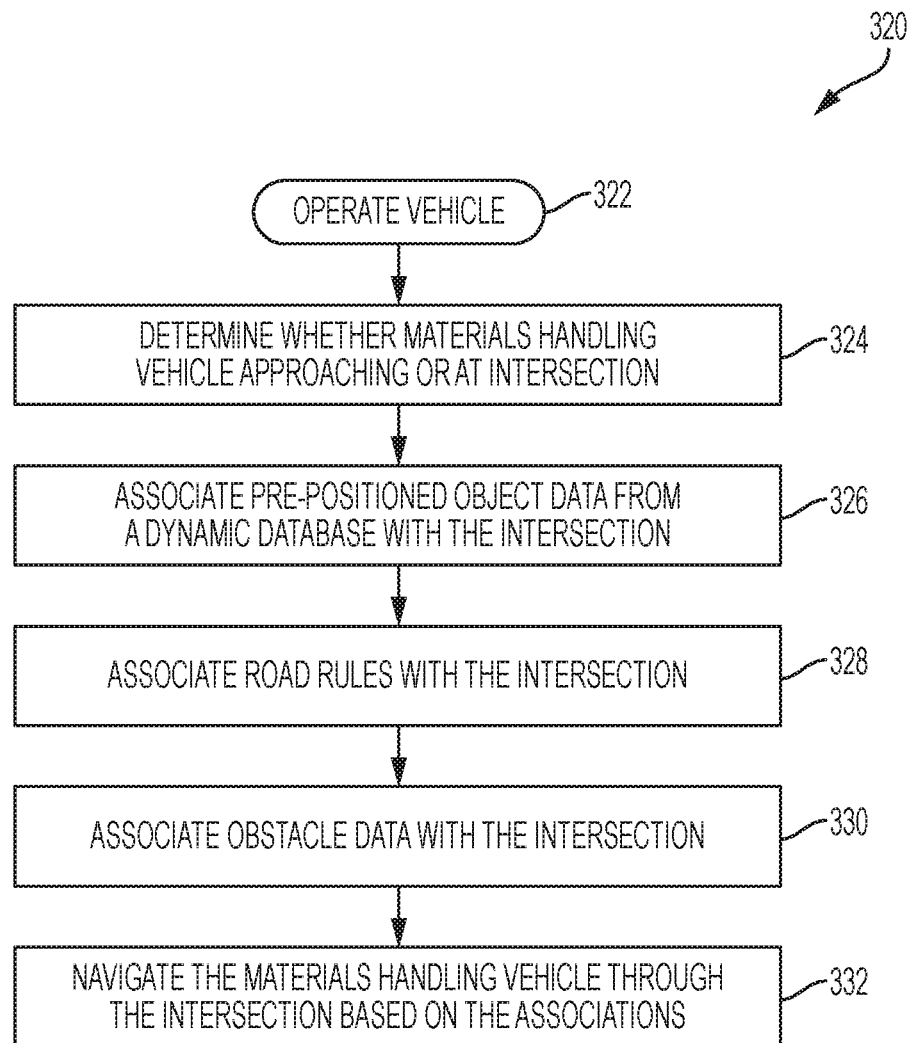
FIG. 3B schematically illustrates another implementation process for a materials handling vehicle-sensor mediated embodiment, according to one or more embodiments shown and described herein.
Figure 3C:
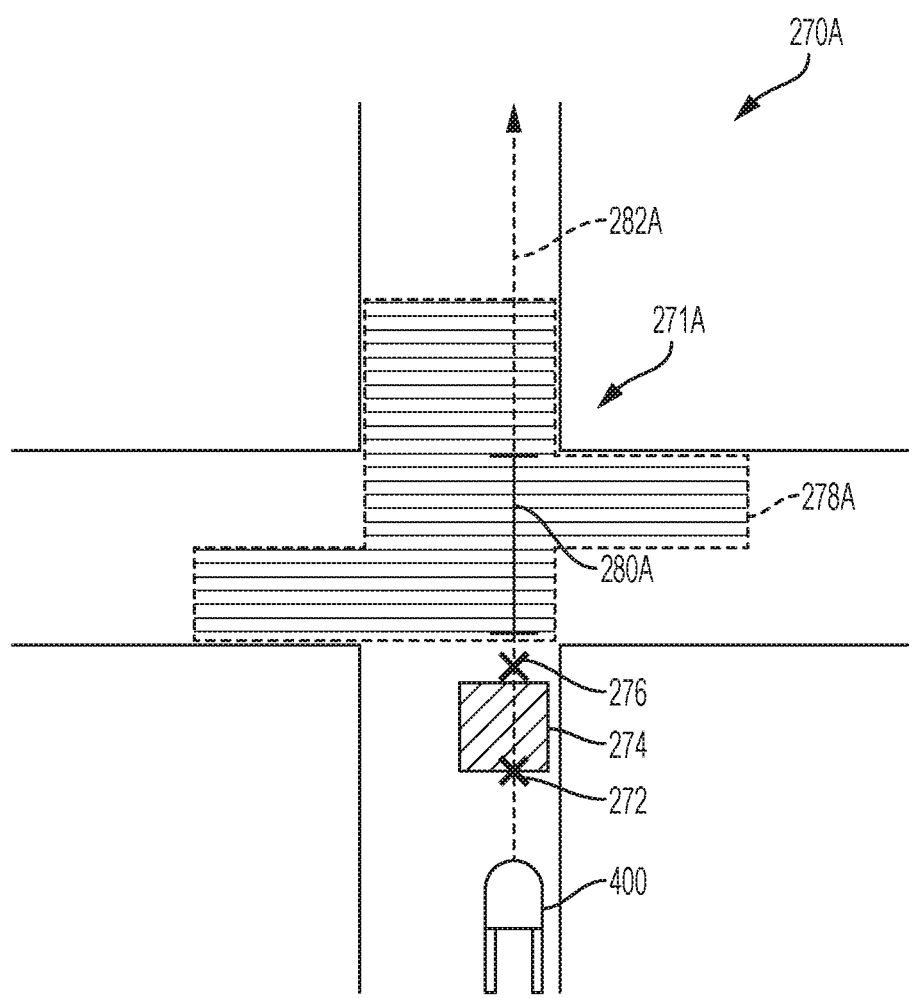
FIG. 3C schematically illustrates an example of the implementation process of FIG. 3A or 3B as applied to a mediated materials handling vehicle approaching a two-way aisle intersection to cross straight through the intersection and a respective give way region, according to one or more embodiments shown and described herein.
Figure 3D:
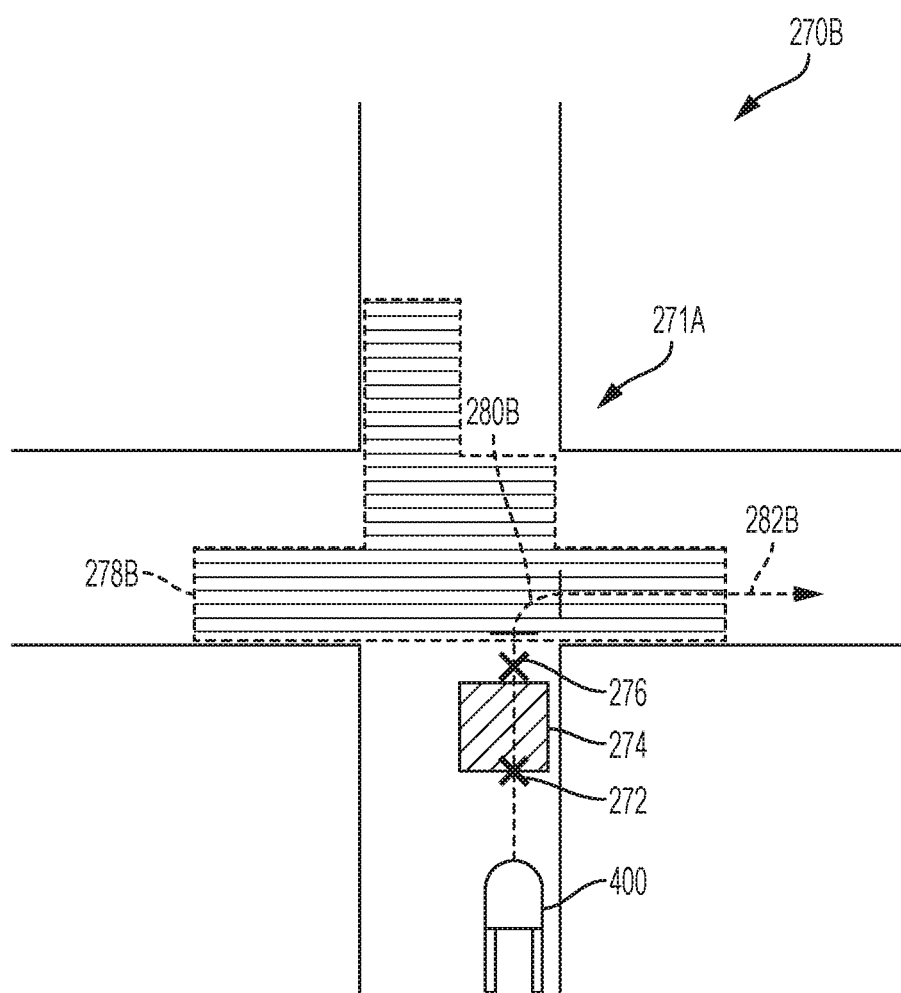
FIG. 3D schematically illustrates an example of the implementation process of FIG. 3A or 3B as applied to a mediated materials handling vehicle approaching the two-way aisle intersection to turn right into the intersection and a respective give way region, according to one or more embodiments shown and described herein.
Figure 3E:
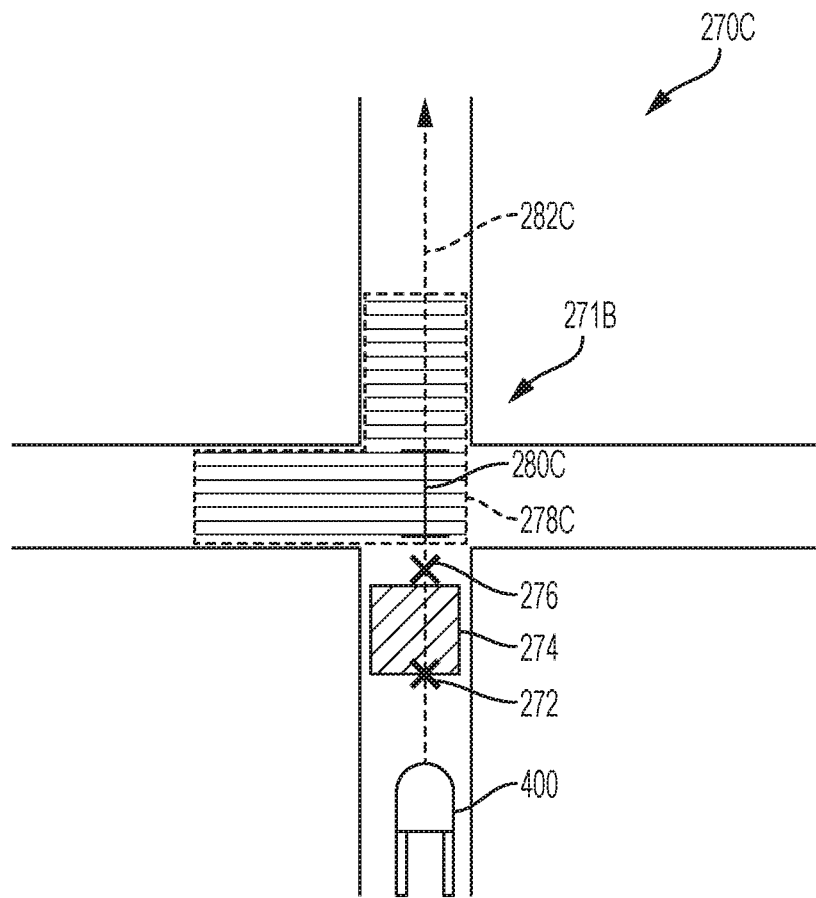
FIG. 3E schematically illustrates an example of the implementation process of FIG. 3A or 3B as applied to a mediated materials handling vehicle approaching a one-way aisle intersection to cross straight through the intersection and a respective give way region, according to one or more embodiments shown and described herein.
Figure 3F:
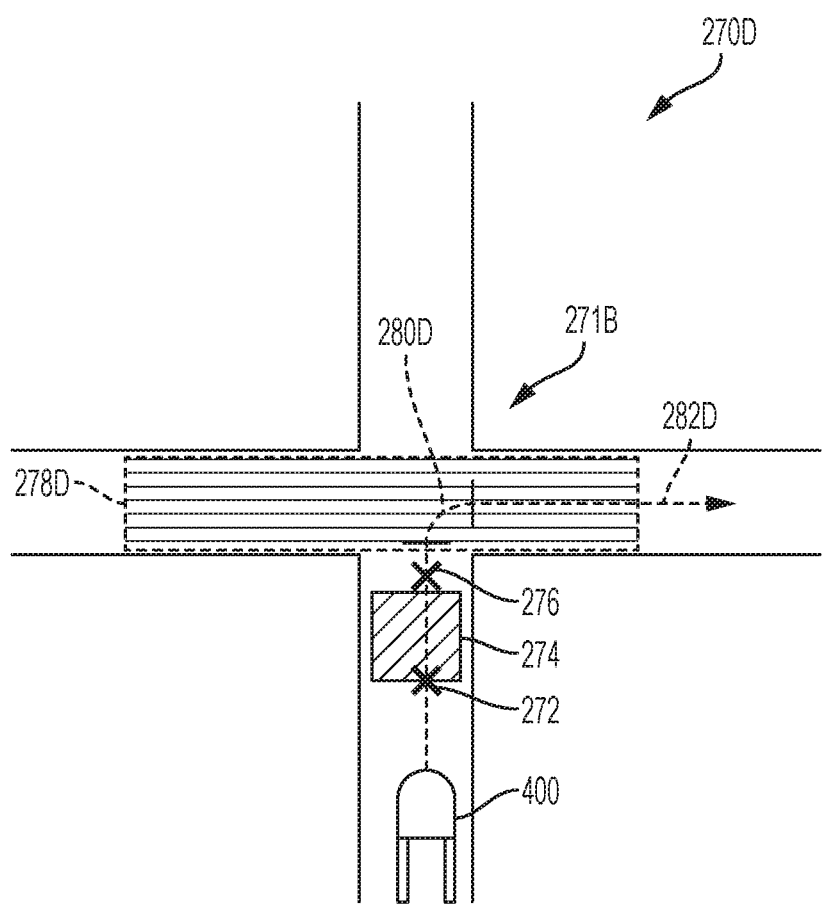
FIG. 3F schematically illustrates an example of the implementation process of FIG. 3A or 3B as applied to a mediated materials handling vehicle approaching the one-way aisle intersection to turn right into the intersection and a respective give way region, according to one or more embodiments shown and described herein.
Figure 7:
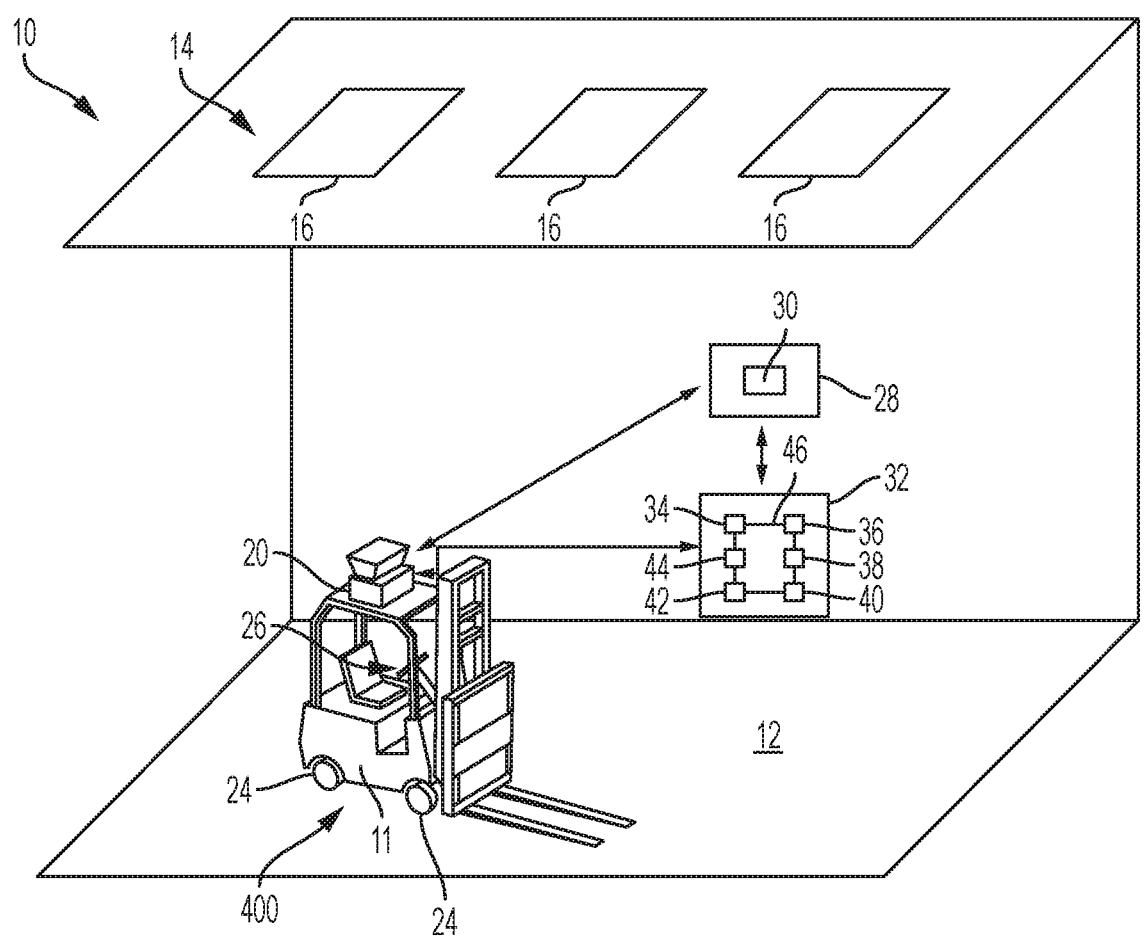
FIG. 7 schematically illustrates a materials handling vehicle in a warehouse environment and an associated system to implement the processes of FIGS. 1A, 1B, 3A and/or 3B, according to one or more embodiments shown and described herein.

Referring to FIG. 3B, an implementation process 320 may initiate with a step 322 to operate the materials handling vehicle and in step 324 determine whether the materials handling vehicle is approaching or at a potentially contested intersection. Referring to FIG. 3C and FIG. 7, the example application 270 may be applied with the implementation process 320 of FIG. 3B. As described above, FIG. 3C illustrates a materials handling vehicle 400 approaching an intersection zone including a potentially contested intersection 271A along the path of an arrow 282A. Referring to FIG. 7, the materials handling vehicle 400 is configured to navigate a vehicle transit surface 12 in a warehouse environment 10. The materials handling vehicle 400 includes a vehicle body 11, a plurality of vehicle wheels 24 supporting the vehicle body 11, a traction control unit 34, a braking system 36, and a steering assembly 38, each operatively coupled to one or more of the plurality of vehicle wheels 24, an obstacle detection subsystem 40, and a navigation subsystem 42. The traction control unit 34, the braking system 36, and the steering assembly 38 may each operatively coupled to one or more of the plurality of vehicle wheels 24 through operator controls 26, for example. The traction control unit 34, the braking system 36, the steering assembly 38, the obstacle detection subsystem 40, and the navigation subsystem 42 may reside on a local terminal 32 of the materials handling vehicle 400.

Referring to FIGS. 3B-3F and FIG. 7, and as set forth in step 324 of FIG. 3B, the navigation subsystem 42 is configured to cooperate with the traction control unit 34, the braking system 36, the steering assembly 38, and the obstacle detection subsystem 40 to determine whether the materials handling vehicle 400 is approaching, or has arrived at, or is otherwise in the vicinity of a potentially contested intersection 271A, 271B. In embodiments, the navigation subsystem 42 is configured to cooperate with the traction control unit 34, the braking system 36, the steering assembly 38, and the obstacle detection subsystem 40 through a communicative coupling 46.

The navigation subsystem 42 is configured to determine whether the materials handling vehicle 400 is approaching, or has arrived at, a potentially contested intersection 271A, 271B by establishing or recognizing an entry zone 274 associated with the potentially contested intersection 271A, 271B, and indicating a presence of the materials handling vehicle 400 in the entry zone 274. The navigation subsystem 42 may establish the entry zone 274 as a virtual boundary in the warehouse environment 10. Alternatively, the navigation subsystem 42 may establish the entry zone 274 as a literal entry zone defined by boundary elements in the warehouse environment 10. As a non-limiting example, one or more RFID tags arranged near the intersection 271A, 271B, at the end of an aisle. In embodiments, the materials handling vehicle 400 may include hardware configured to establish or recognize the entry zone 274 associated with the potentially contested intersection 271A, 271B, which hardware may include a sensor array including at least one of a laser sensor, a radar sensor, and an image sensor.

The navigation subsystem 42 may be configured to determine whether the materials handling vehicle 400 is approaching, or has arrived at, a potentially contested intersection 271A, 271B by interacting with a localization subsystem to determine a position and heading of the materials handling vehicle 400 relative to the potentially contested intersection 271A, 271B. The localization subsystem may be configured to receive measurement data from one or more sensors of the materials handling vehicle 400 and determine the position and heading of the materials handling vehicle 400 in the warehouse environment 10 based on the measurement data. The localization subsystem is configured to interact with one or more warehouse maps 730, described in greater detail below, to determine the position and heading of the potentially contested intersection 271A, 271B relative to the materials handling vehicle 400. In an embodiment, the localization subsystem resides on the materials handling vehicle 400. In an alternative embodiment, the localization subsystem is remote from the materials handling vehicle 400.

The navigation subsystem 42 may further include one or more environmental sensors configured to capture data indicative of a heading and position of the materials handling vehicle 400 relative to the vehicle transit surface 12. The one or more environmental sensors may comprise one or more image sensors disposed to face an upward direction to detect upwardly disposed features 14 in the warehouse environment 10. For example, the image sensors may be one or more cameras 20 disposed to face the upward direction, and the upwardly disposed features comprise one or more lights, one or more skylights 16, or both. Additionally or alternatively, the one or more environmental sensors may be one or more image sensors disposed to face a lateral direction in the warehouse environment 10 to detect laterally disposed features in the warehouse environment 10. Additionally or alternatively, the one or more environmental sensors may be a tag reader configured to read one or more RFID tags disposed in the warehouse environment 10. The one or more environmental sensors may be hardware on the materials handling vehicle 400 comprising a sensor array, the sensor array comprising at least one of a laser sensor, a radar sensor, and an image sensor.

The navigation subsystem 42 may comprise one or more environmental sensors and an environmental database. In embodiments, the environmental sensors are configured to capture data indicative of a position of the materials handling vehicle 400 relative to the vehicle transit surface 12 in the warehouse environment 10. Further, the environmental database may reside on or be remote from the materials handling vehicle 400 and may comprise stored data indicative of the one or more intersections, the vehicle transit surface 12, or both. The navigation subsystem 42 may be configured to enable at least partially automated navigation of the materials handling vehicle along the vehicle transit surface 12 utilizing the captured data and the stored data. For example, and not by way of limitation, it is contemplated that the navigation subsystem 42, the localization system, or both may utilize a stored warehouse map 730 and captured images of ceiling lights or skylights 16 to enable navigation, localization, or both, as is disclosed in U.S. Pat. No. 9,174,830 issued on Nov. 3, 2015, (CRNZ 0053 PA), U.S. Pat. No. 9,340,399 issued on May 17, 2016 (docket no. CRNZ 0053 NA), U.S. Pat. No. 9,349,181 issued on May 24, 2016 (docket no. CRNZ 0052 PA), U.S. Pat. No. 9,958,873 issued May 1, 2018 (docket no. INRO 0009 NA), and other similar patents and patent publications. It is further contemplated that the navigation subsystem 42, the localization subsystem, or both may utilize a stored warehouse map 730 and a tag layout disposed on the vehicle transit surface 12 as disclosed in U.S. Pat. No. 9,811,088 issued on Nov. 7, 2017 (CRO 0056 PA), and other similar patents and patent publications. Additional suitable environmental sensors include, but are not limited to, inertial sensors, lasers, antennae for reading RFID tags, buried wires, WiFi signals, or radio signals, global positioning system (GPS) sensors, global navigation satellite system (GNSS) sensors, or combinations thereof.

The navigation subsystem 42 is further configured to cooperate with the traction control unit 34, the braking system 36, the steering assembly 38, and the obstacle detection subsystem 40 to associate pre-positioned warehouse object data derived from a database of pre-positioned warehouse objects 30 in the warehouse environment 10 with the potentially contested intersection 271A, 271B, as set forth in step 326 of FIG. 3B. The associated pre-positioned warehouse object data may represent warehouse racking features, warehouse hardware defining warehouse aisles, other warehouse infrastructure, or a combination thereof. The database may be "dynamic," i.e., the associated pre-positioned object data within the database as a dynamic database may be updated when the aforementioned warehouse infrastructure change with respect to the warehouse environment 10. In an embodiment, associating pre-positioned warehouse object data derived from the database of pre-positioned warehouse objects 30 in the warehouse environment 10 with the potentially contested intersection 271A, 271B may include updating locations of one or more pre-positioned warehouse objects that change with respect to the warehouse environment in the database of pre-positioned warehouse objects. As a non-limiting example, the database of pre-positioned warehouse objects may be dynamic and the database of pre-positioned objects may be updated to represent location changes of one or more pre-positioned warehouse objects with respect to the warehouse environment, additions to or deletion of one or more pre-positioned warehouse objects in the warehouse environment, or a combination thereof. The database of pre-positioned warehouse objects 30 may be stored at a location that is remote from the materials handling vehicle 400, such as at a remote terminal 28 remote from the materials handling vehicle 400. The materials handling vehicle 400 comprises communications hardware configured to access the remote database of pre-positioned warehouse objects 30. Alternatively, the database of pre-positioned warehouse objects 30 may reside on the materials handling vehicle 400.

In an embodiment, a system may include the remote terminal 28, the materials handling vehicle 400 configured to navigate the vehicle transit surface 12 in the warehouse environment 10, and the database of pre-positioned warehouse objects 30 in the warehouse environment, wherein the navigation subsystem is configured to communicate with the remote terminal 28. The remote terminal 28 may be configured to maintain the database of pre-positioned warehouse objects 30.

The navigation subsystem 42 is further configured to cooperate with the traction control unit 34, the braking system 36, the steering assembly 38, and the obstacle detection subsystem 40 to associate a set of road rules 44 with the potentially contested intersection, as set forth in step 328 of FIG. 3B, and associate obstacle data derived from the obstacle detection subsystem 40 with the potentially contested intersection 271A, 271B, as set forth in step 330 of FIG. 3B. In an embodiment, the navigation subsystem 42 is further configured to determine whether the obstacle data derived from the obstacle detection subsystem 40 correlates with a competing materials handling vehicle 400 or a non-vehicular obstacle. The navigation subsystem 42 may be further configured to determine whether at least a portion of the obstacle data derived from the obstacle detection subsystem 40 correlates with a competing materials handling vehicle 400. Alternatively, the navigation subsystem 42 is further configured to determine whether the obstacle data derived from the obstacle detection subsystem 40 correlates with a pre-positioned warehouse object from the database of pre-positioned warehouse objects 30.

In embodiments, the obstacle detection subsystem 40 may include an obstacle scanning device, an imaging system, a range finder, a radar sensor, a ladar sensor, a laser scanner, or combinations thereof. The obstacle detection subsystem 40 may utilize detection hardware operating in the infrared or visible wavelength ranges.

The navigation subsystem 42 is further configured to cooperate with the traction control unit 34, the braking system 36, the steering assembly 38, and the obstacle detection subsystem 40 to navigate the materials handling vehicle 400 through the potentially contested intersection 271A, 271B utilizing warehouse navigation maneuvers in combination with the associated set of road rules 44, obstacle avoidance maneuvers, or both, as set forth in step 332 of FIG. 3B. The warehouse navigation maneuvers may comprise conventional, or yet to be developed, maneuvers for successfully navigating a materials handling vehicle through a warehouse environment, such as, for example, navigation maneuvers described in U.S. Pat. No. 9,174,830 issued on Nov. 3, 2015, (CRNZ 0053 PA), U.S. Pat. No. 9,340,399 issued on May 17, 2016 (docket no. CRNZ 0053 NA), and other similar patents and patent publications. The warehouse navigation maneuvers account for the associated pre-positioned warehouse object data, such as, for example, warehouse racking features, warehouse hardware defining warehouse aisles, or other warehouse infrastructure. The obstacle avoidance maneuvers may comprise conventional, or yet to be developed, maneuvers for successfully navigating a materials handling vehicle around non-vehicular obstacles in a warehouse environment, such as, for example, obstacle avoidance maneuvers described in U.S. Pat. No. 9,958,873 issued May 1, 2018 (docket no. INRO 0009 NA), and other similar patents and patent publications. The obstacle avoidance maneuvers account for obstacle data derived from the obstacle detection subsystem 40, such as, for example, loaded or unloaded warehouse pallets, debris, and other obstacles that would potentially obstruct traffic flow in a warehouse environment.

In an embodiment, the navigation subsystem 42 is further configured to navigate the materials handling vehicle 400 through the potentially contested intersection 271A, 271B utilizing the warehouse navigation maneuvers and either the associated set of road rules 44 or the obstacle avoidance maneuvers, depending on whether the obstacle data correlates with a competing materials handling vehicle 400 or a non-vehicular obstacle. As a non-limiting example, the navigation subsystem 42 is further configured to navigate the materials handling vehicle 400 through the potentially contested intersection 271A, 271B utilizing the warehouse navigation maneuvers and the associated set of road rules 44, when the obstacle data correlates with a competing materials handling vehicle 400. Further, the navigation subsystem 42 is further configured to navigate the materials handling vehicle through the potentially contested intersection 271A, 271B utilizing the warehouse navigation maneuvers and the obstacle avoidance maneuvers, when the obstacle data correlates with a non-vehicular obstacle.

The associated set of road rules 44 may account for vehicle positioning relative to the potentially contested intersection 271A, 271B, intersection characteristics defining the potentially contested intersection 271A, 271B, or both. By way of example, and not has a limitation, the associated set of road rules accounts for intersection characteristics defining the potentially contested intersection 271A, 271B.

In another embodiment, the navigation subsystem 42 is further configured to navigate the materials handling vehicle 400 through the potentially contested intersection 271A, 271B utilizing the warehouse navigation maneuvers when the obstacle data correlates with a pre-positioned warehouse object.

Referring to FIGS. 3C-3F, the navigation subsystem 42 may further be configured to define a give way region 278A, 278B, 278C, 278D associated with the potentially contested intersection 271A, 271B. Referring to FIGS. 3C-3D, each give way region 278A, 278B is associated with the potentially contested intersection 271A. Referring to FIGS. 3E-3F, each give way region 278C, 278D is associated with the potentially contested intersection 271B. The give way region 278A, 278B, 278C, 278D may be a function of an intersection type associated with the potentially contested intersection 271A, 271B and a projected vehicle heading 282A, 282B, 282C, 282D associated with the materials handling vehicle 400, relative to the potentially contested intersection 271A, 271B. Referring to FIGS. 3C-3D, as a non-limiting example, the respective give way region 278A, 278B may be a function of an intersection type associated with the potentially contested intersection 271A and a respective projected vehicle heading 282A, 282B, associated with the materials handling vehicle 400, relative to the potentially contested intersection 271A. Referring to FIGS. 3E-3F, as a non-limiting example, the respective give way region 278C, 278D may be a function of an intersection type associated with the potentially contested intersection 271B and a respective projected vehicle heading 282C, 282D associated with the materials handling vehicle 400, relative to the potentially contested intersection 271B.

Referring to FIGS. 3C-3F and 7, the navigation subsystem 42 may further be configured to limit the set of road rules 44 associated with the potentially contested intersection 271A, 271B by conforming the set of road rules 44 to the defined give way region 278A, 278B, 278C, 278D. The navigation subsystem 42 may further be configured to navigate the materials handling vehicle 400 through the potentially contested intersection 271A, 271B utilizing the warehouse navigation maneuvers and the conformed set of road rules 44 when the obstacle data correlates with a competing materials handling vehicle 400. Additionally or alternatively, the navigation subsystem 42 may further be configured to limit the obstacle data associated with the potentially contested intersection 271A, 271B by conforming the obstacle data to the defined give way region 278A, 278B, 278C, 278D, and navigate the materials handling vehicle 400 through the potentially contested intersection 271A, 271B utilizing the warehouse navigation maneuvers, the obstacle avoidance maneuvers, and the conformed obstacle data, when the obstacle data correlates with a non-vehicular obstacle.

In an embodiment, an implementation process for a materials handling vehicle-sensor mediated embodiment comprises a step in which a materials handling vehicle determines an approach to and approaches a controlled area such as an entry/prompt zone of a pre-commissioned intersection. In a following step, road rules are applied to the intersection as described herein from zone data to determine the one or more zones (i.e., zone(s)) defining a give way region to clear in the intersection. In a next step, the materials handling vehicle laser-scans the give way region. After such scanning, a determination is made as to whether the zone(s) defining the give way region contain another materials handling vehicle such that the zone(s) are not clear. If so, the materials handling vehicle proceeds to continue to scan the give way region and wait until the zone(s) are clear. If not, and the zone(s) are clear, then the materials handling vehicle proceeds through the intersection.

Embodiments may feature further additional or alternative mediated intersections, such as local network based peer to peer mediation and/or a smart traffic light type of solution, for example. This would allow for sites that feature more complex intersections such as all way stop, or shared single lanes. Some form of connectivity may be utilized at mediation points, which could be a direct local link, may utilize a band (that is not, for example, 2.4 GHz such that a standard wireless fidelity ("wi-fi") system operating on the 2.4 GHz band in the warehouse environment is not utilized or interrupted). In embodiments, an implementation of connectivity at mediation points may use visual indication and image recognition and/or or an active RFID pill.

In peer to peer mediated embodiments, vehicle to vehicle communication may be used to negotiate intersection behavior. A type of peer to peer transceiver (such as zigbee, Bluetooth, wifi-direct, UWB, and the like) may be used to identify other materials handling vehicles in the area. Such a peer to peer mediated embodiment may allow for intent to be shared between materials handling vehicles, but may still require some sort of static rule set to negotiate priority between materials handling vehicle movement (such as fixed priority for certain materials handling vehicles, priority based on intent or time waiting, and the like).

The remote, local, and/or vehicle-sensor mediated embodiments may be scalable to support any number of autonomous and/or manual materials handling vehicles. In order to improve interactions with manual drivers, the remote, local, and/or vehicle-sensor mediated embodiments above could be combined with a smart traffic light system to indicate intersection state. For example, a smart traffic light system may comprise a set of physical lights configured to indicate to manual drivers when they should proceed through the intersection such that manual drivers are provided with control options.

Some embodiments may feature infrastructure-based intersection mediation, where a piece of infrastructure such as a smart traffic light may mediate the intersection. In embodiments, implementation may utilize external infrastructure, such as a physical smart traffic light, a virtual traffic light run on a server, smart RFID pills disposed on or within a warehouse floor or other intersection locations, for example, and the like. A materials handling vehicle mounted display could also be used to indicate this information with respect to manual materials handling vehicles that comprise had suitable connectivity and display systems.

IV. Application of Local Road Rules

In embodiments that only use standalone local road rules, one or more onboard lasers may be used for traffic detection and basic positional local road rules implemented. This may allow for simple loops, joining paths, one way intersections, single lane aisles and pedestrian crossings, etc., and no server or network access may be needed in this type of embodiment.

FIGS. 4A-4M illustrate different examples of the application of local road rules to an intersection. For example, typical rules for right-side driving may be applied. Cross-hatching in FIGS. 4A-4M is indicative of one or more scanned and active give way zones to which to apply driving rules as described below. Further, a materials handling vehicle having a right of way R is indicated in FIGS. 4A-4M, as described in greater detail below.

Figure 4A:
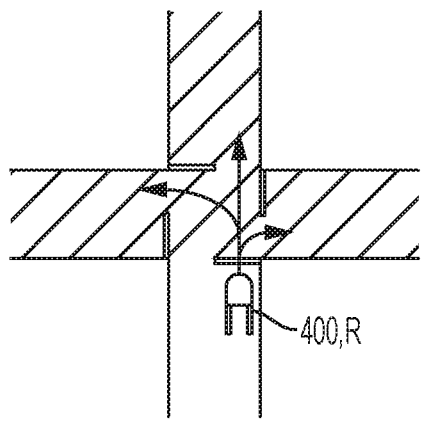
FIG. 4A schematically illustrates the application of local road rules where a mediated materials handling vehicle approaches a clear intersection and has the right of way.

FIG. 4A illustrates the application of local road rules where a mediated materials handling vehicle 400 approaches a clear intersection and has the right of way R. For example, as illustrated in FIG. 4A, if a mediated materials handling vehicle 400 approaches or has approached a clear intersection, in which the lanes of the other approach zones of the intersection are clear, the mediated materials handling vehicle 400 may be instructed to proceed through the intersection in any direction (straight through or turning right or left).

Figure 4B:
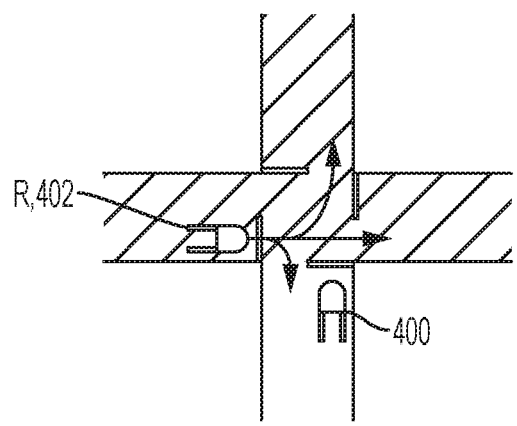
FIG. 4B schematically illustrates the application of local road rules where a mediated materials handling vehicle does not have the right of way when approaching an intersection with another materials handling vehicle positioned in a left approach zone of the intersection.

However, if the mediated materials handling vehicle 400 has approached an intersection that includes another materials handling vehicle 402 to left of the mediated materials handling vehicle 400, i.e., in the left approach zone, and has a heading to cross through or turn within the intersection, as illustrated in FIG. 4B, the mediated materials handling vehicle 400 may be instructed to wait for the other materials handling vehicle 402 to cross and clear the intersection. Thus, FIG. 4B sets forth the application of local road rules where a mediated materials handling vehicle 400 does not have the right of way R when approaching an intersection that includes another materials handling vehicle in the left approach zone. Rather, the other materials handling vehicle 402 has the right of way R.

Figure 4C:
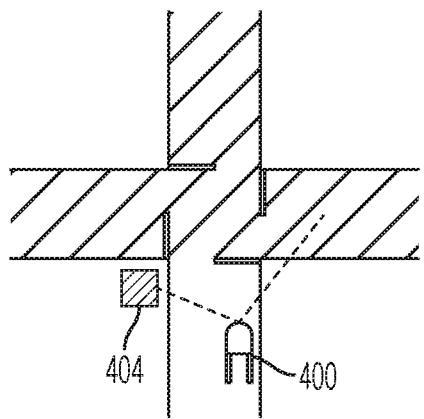
FIG. 4C schematically illustrates the application of local road rules where a mediated materials handling vehicle does not have the right of way when approaching an intersection at which an obstacle blocks a materials handling vehicle-sensor field of view of a left approach zone of the intersection.

FIG. 4C illustrates the application of local road rules where a mediated materials handling vehicle 400 does not have the right of way R when approaching an intersection with an obstacle blocking a field of view of a sensor disposed on the mediated materials handling vehicle 400 with respect to a left approach zone. For example, with a vehicle-sensor mediated embodiment and referring to FIG. 4C, a mediated materials handling vehicle 400 may approach an intersection at which an obstacle 404 blocks the materials handling vehicle sensor's field of view with respect to the left approach zone. The mediated materials handling vehicle 400 may be instructed to slow to a stop-and-scan area to be able to detect the obstacle 404 and proceed through an implementation process where the mediated materials handling vehicle 400 would need to verify that the intersection is clear before proceeding through the intersection.

Figure 4D:
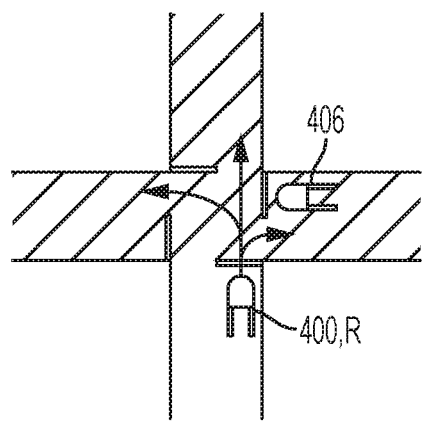
FIG. 4D schematically illustrates the application of local road rules where a mediated materials handling vehicle has the right of way when approaching an intersection with another materials handling vehicle positioned in a right approach zone of the intersection.
Figure 4E:
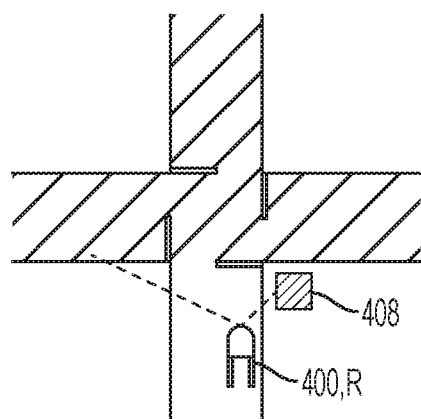
FIG. 4E schematically illustrates the application of local road rules where a mediated materials handling vehicle has the right of way when approaching an intersection with an obstacle blocking a materials handling vehicle-sensor field of view of a right approach zone of the intersection.

FIG. 4D illustrates the application of local road rules where a mediated materials handling vehicle 400 has the right of way R when approaching an intersection with another materials handling vehicle 406 positioned at the intersection in a right approach zone of the intersection, to the right the of mediated materials handling vehicle 400. The other materials handling vehicle 406 may have a heading to cross through, or turn within, the intersection. FIG. 4E sets forth the application of local road rules where a mediated materials handling vehicle 400 has the right of way R when approaching an intersection with an obstacle 408 blocking a field of view of a sensor disposed on the mediated materials handling vehicle 400 with respect to a right approach zone of the intersection. In either scenario of FIGS. 4D-4E, the local road rules may provide that the mediated materials handling vehicle 400 has the right of way R, and the mediated materials handling vehicle 400 is instructed by the system to proceed through and/or turn within the intersection.

Figure 4F:
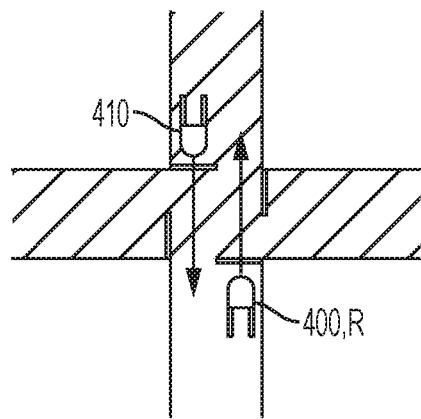
FIG. 4F schematically illustrates a scenario where a mediated materials handling vehicle has the right of way when crossing straight through an intersection with another oppositely facing materials handling vehicle positioned across the intersection to cross straight through the intersection.
Figure 4G:
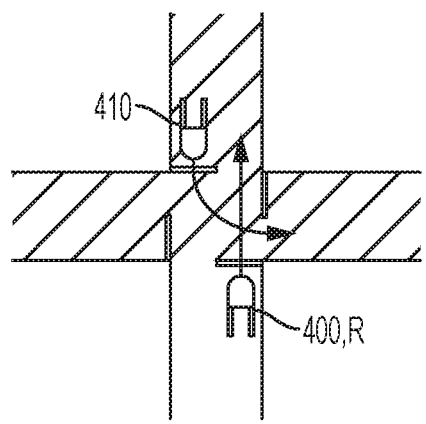
FIG. 4G schematically illustrates a scenario where a mediated materials handling vehicle has the right of way when crossing straight through an intersection with another oppositely facing materials handling vehicle positioned across the intersection to turn left into the intersection.

FIG. 4F illustrates a scenario where a mediated materials handling vehicle 400 has the right of way R when crossing straight through an intersection with another oppositely facing materials handling vehicle 410 positioned across the intersection to cross straight through the intersection. FIG. 4G illustrates another scenario where a mediated materials handling vehicle 400 has the right of way R when crossing straight through an intersection with another oppositely facing materials handling vehicle 410 positioned across the intersection to turn left into the intersection. In either scenario of FIGS. 4F-4G, the mediated materials handling vehicle 400 has the right of way R and is instructed to proceed through the intersection at an appropriate speed. Further, in the scenario of FIG. 4G, the other materials handling vehicle 410 will have to give way to and wait for the mediated materials handling vehicle 400 to proceed through the intersection.

Figure 4H:
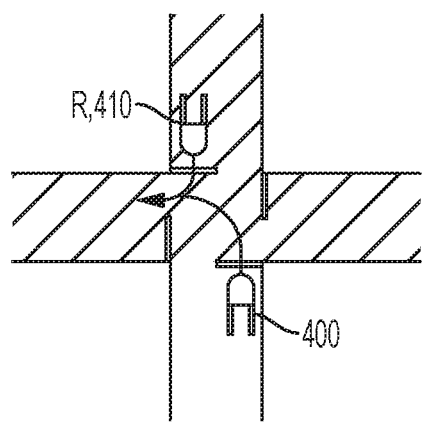
FIG. 4H schematically illustrates the application of local road rules where a mediated materials handling vehicle does not have the right of way when turning left into an intersection with another oppositely facing materials handling vehicle positioned across the intersection to turn left into the intersection.
Figure 4I:
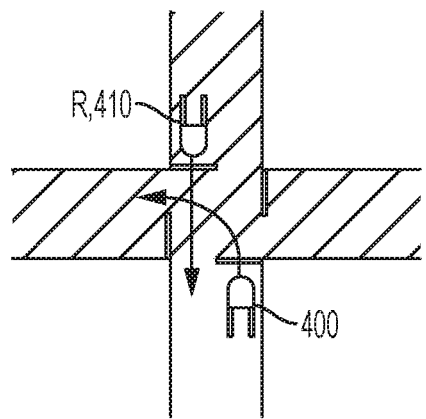
FIG. 4I schematically illustrates the application of local road rules where a mediated materials handling vehicle does not have the right of way when turning left into an intersection with another oppositely facing materials handling vehicle positioned across the intersection to cross straight through the intersection.
Figure 4J:
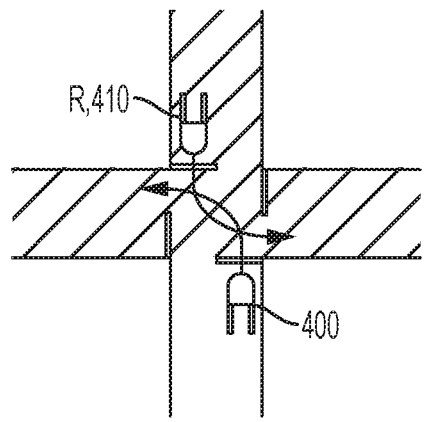
FIG. 4J schematically illustrates the application of local road rules where a mediated materials handling vehicle does not have the right of way when turning left into an intersection with another oppositely facing materials handling vehicle positioned across the intersection to turn right into the intersection.

FIGS. 4H-4J illustrate the application of local road rules where a mediated materials handling vehicle 400 does not have the right of way R when turning left into an intersection with another oppositely facing materials handling vehicle 410 positioned across the intersection. In FIG. 4H, the other materials handling vehicle 410 has a heading to take a right turn through the intersection. In FIG. 4I, the other materials handling vehicle 410 has a heading to cross through the intersection. In FIG. 4J, the other materials handling vehicle 410 has a heading to take a left turn through the intersection. In any of these scenarios of FIGS. 4H-4J, the mediated materials handling vehicle 400 is to give way to the other materials handling vehicle 410 that will have the right of way R to avoid potential deadlock and/or collision.

Figure 4K:
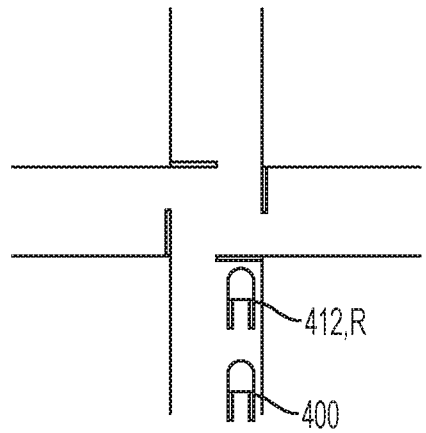
FIG. 4K schematically illustrates the application of local road rules where a mediated materials handling vehicle does not have right of way when approaching an intersection behind another materials handling vehicle.

FIG. 4K illustrates the application of local road rules where a mediated materials handling vehicle 400 does not have right of way R when approaching an intersection behind another materials handling vehicle 412. The mediated materials handling vehicle 400 may be instructed to use a laser scanner to detect the other materials handling vehicle 412 in front of the mediated materials handling vehicle 400 as the mediated materials handling vehicle 400 approaches the intersection. The mediated materials handling vehicle 400 may be instructed to wait until the other materials handling vehicle 412, which has the right of way R, clears the intersection, and then may need to re-apply road rules prior to proceeding through the intersection.

Figure 4L:
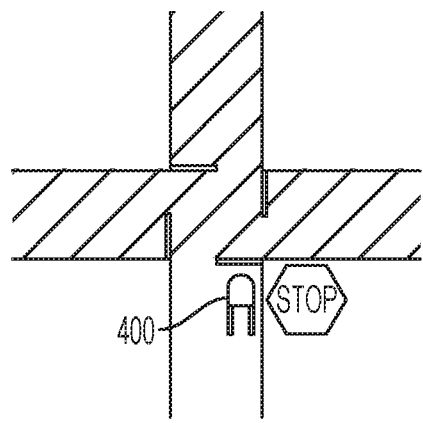
FIG. 4L schematically illustrates the application of local road rules where a mediated materials handling vehicle does not have right of way when approaching an intersection having a stop sign such that the mediated materials handling vehicle must make sure that all stop zones are clear prior to proceeding.

FIG. 4L illustrates the application of local road rules where a mediated materials handling vehicle 400 does not have right of way R when approaching an intersection having a stop sign. The mediated materials handling vehicle 400 may be instructed to stop and give way to all approach zones not affected by a stop sign. For example, stop zones may include right approach zones, left approach zones, and crossing zones. For intersections with multiple stop signs, local road rules may be applied to determine give way patterns based on order of approach to each stop sign. For example, a materials handling vehicle that is second to stop at a second stop sign gives way to a materials handling vehicle that is first to stop at a first stop sign.

Figure 4M:
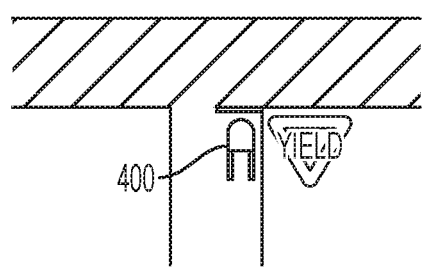
FIG. 4M schematically illustrates the application of local road rules where a mediated materials handling vehicle does not have right of way when approaching an intersection having a yield sign such that the mediated materials handling vehicle must make sure that all yield zones are clear prior to proceeding.

FIG. 4M illustrates the application of local road rules where a mediated materials handling vehicle does not have right of way R when approaching an intersection having a yield sign. The mediated materials handling vehicle 400 will be instructed to yield and give way to right and left approach zones (i.e., the yield zones), for example.

V. Types of Intersections and System Requirements

FIGS. 5A-5I illustrate various additional types of intersections that may be encountered by a materials handling vehicle and are described below with respect to their associated requirements. Subtle variations of these intersections may exist, such as where congestion may occur that turns a relatively simple intersection into a more complex one. For example, a tail of a queue of materials handling vehicles waiting at one point may interfere with traffic leaving that point in a different direction, increasing the complexity of the intersection.

Figure 5A:
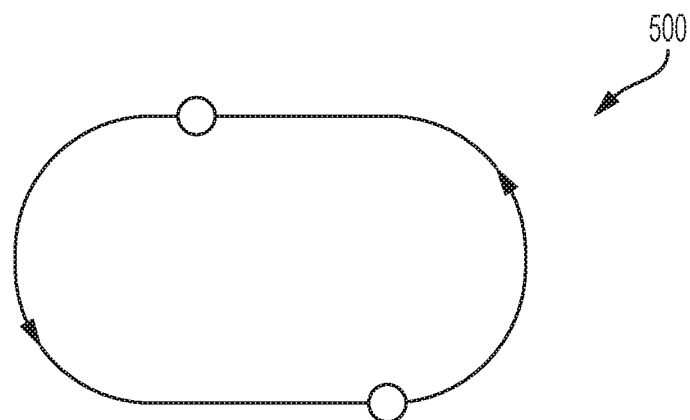
FIG. 5A schematically illustrates an example of a simple loop intersection, according to one or more embodiments shown and described herein.

Referring to FIG. 5A, a simple loop intersection 500 is illustrated. A no passing rule is assumed and the only materials handling vehicle interaction that occurs includes that a following materials handling vehicle may need to slow down for a materials handling vehicle positioned in front of the following materials handling vehicle.

Figure 5B:
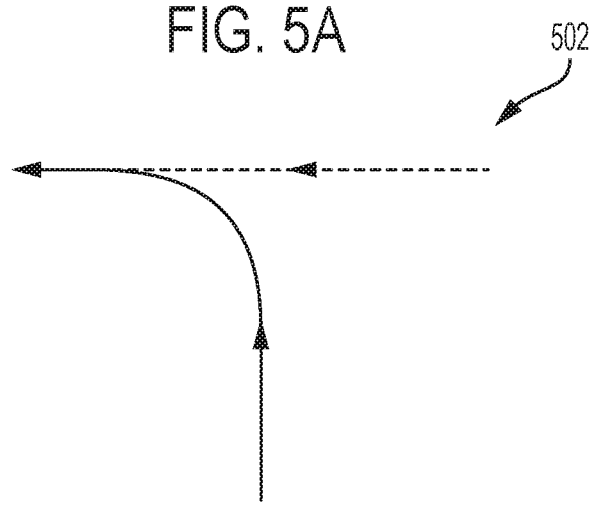
FIG. 5B schematically illustrates an example of a joining paths intersection, according to one or more embodiments shown and described herein.

Referring to FIG. 5B, a joining paths intersection 502 is illustrated. A single direction joining path enters and joins with a traffic lane that includes existing traffic. A mediated materials handling vehicle 400 (as illustrated in FIGS. 4A-4M, for example) that may be on the joining path and entering the lane with existing traffic is instructed to wait for a clear section of the traffic lane prior to merging into the traffic lane.

Figure 5C:
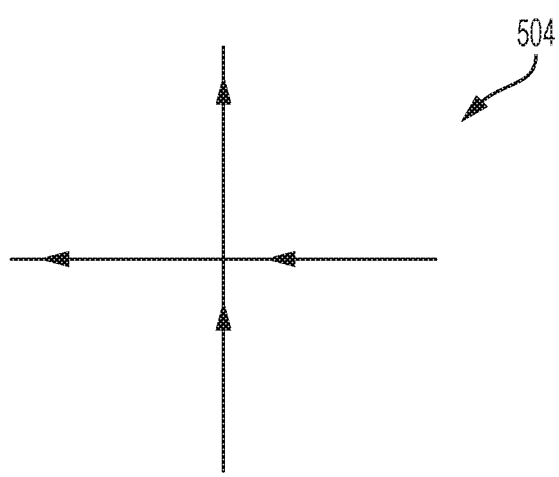
FIG. 5C schematically illustrates an example of a one way intersection, according to one or more embodiments shown and described herein.

Referring to FIG. 5C, a one way intersection 504 is illustrated that comprises a pair of cross one-way routes. Simply give way local road rules may be applied to this type of intersection. For example, a mediated materials handling vehicle 400 may be expected to pause at the cross to allow traffic to proceed based on the applied local road rules.

Figure 5D:
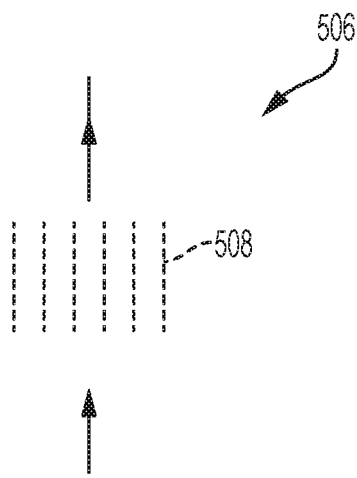
FIG. 5D schematically illustrates an example of a crossing intersection, according to one or more embodiments shown and described herein.

Referring to FIG. 5D, a crossing intersection 506 is illustrated such as a pedestrian or other crossing 508 that acts as a section of a path at which a mediated materials handling vehicle 400 is expected to pause to allow other traffic to proceed, similar to the one way intersection 504.

Figure 5E:
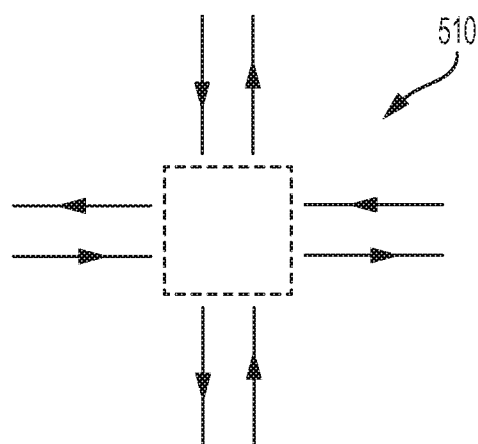
FIG. 5E schematically illustrates an example of an all way stop intersection, according to one or more embodiments shown and described herein.

Referring to FIG. 5E, an all way stop intersection 510 comprises a more complex intersection including multiple two lane routes that intersect. Local road rules as described herein may be applied to these types of intersections, and/or rules applying first in/first out conventions may be applied.

Figure 5F:
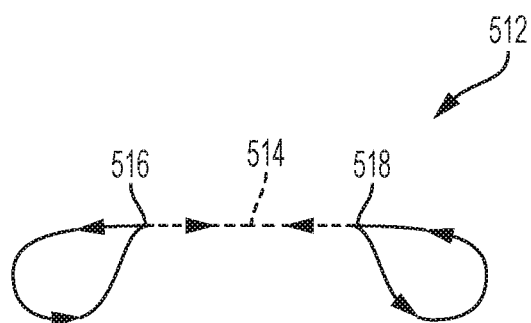
FIG. 5F schematically illustrates an example of a shared single lane segment intersection, according to one or more embodiments shown and described herein.

Referring to FIG. 5F, a shared single lane segment intersection 512 comprises a shared single lane that carries bi-directional traffic such that it is possible for two materials handling vehicles to deadlock by facing each other along the central, bi-directional segment 514. Such a path may occur along long corridors, elevators, pinch points, and the like. In embodiments, local information may not be sufficient to resolve such situations and traffic signals may need to be employed that are coordinated at each end 516, 518 of the bi-directional segment 514. Such traffic signals may employ, for example, a first-come/first serve rules with respect to usage of the bi-directional segment 514 or a green "go" signal for a predetermined period of time that switches between the ends 516, 518 of the bi-directional segment 514.

Figure 5G:
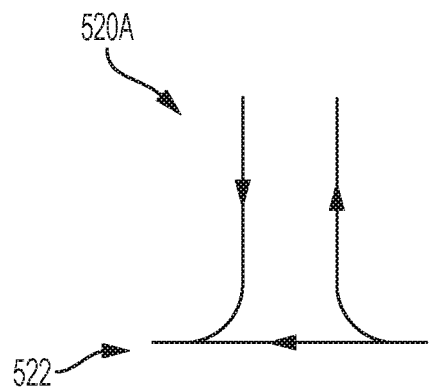
FIG. 5G schematically illustrates an example of an aisle exit intersection for exit/entry into a single direction path, according to one or more embodiments shown and described herein.
Figure 5H:
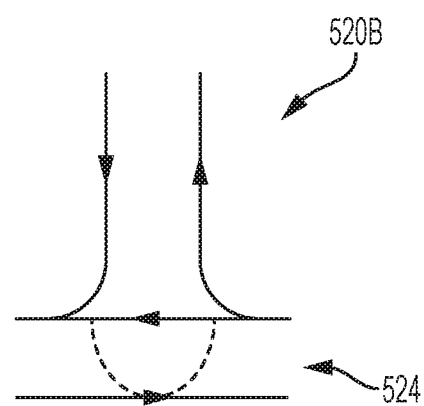
FIG. 5H schematically illustrates an example of another aisle exit intersection for exit/entry into a two lane path, according to one or more embodiments shown and described herein.

Referring to FIGS. 5G-5H, alternative embodiments of an aisle exit intersection 520A, 520B are illustrated. For example, exiting or entering a single direction aisle to either a single direction path 522, as illustrated in FIG. 5G, or a two lane path 524, as illustrated in FIG. 5H, may apply simple local road rules employing give way rules. For example, an applied give way rule may be that a truck exiting the aisle gives way to all traffic. In embodiments in which a single direction aisle is part of a serpentine arrangement, for example, no conflict exists between trucks entering and leaving the aisle.

Figure 5I:
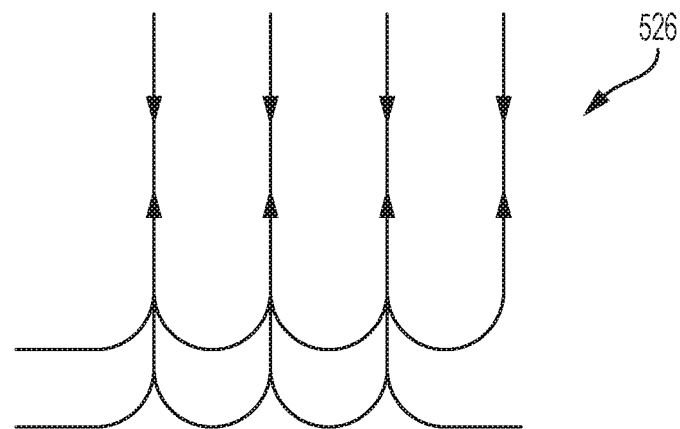
FIG. 5I schematically illustrates an example of a bi-directional traffic in aisle intersection, according to one or more embodiments shown and described herein.

Referring to FIG. 5I, a bi-directional traffic in aisle intersection 526 is illustrated as a more complex intersection. In embodiments, smart traffic lights may be employed but would need to be employed for each aisle. Further, knowledge of a current materials handling vehicle occupancy of each aisle and the intent of the materials handling vehicles at the entry and exit points of each aisle would be needed to manage traffic.

Figure 6:
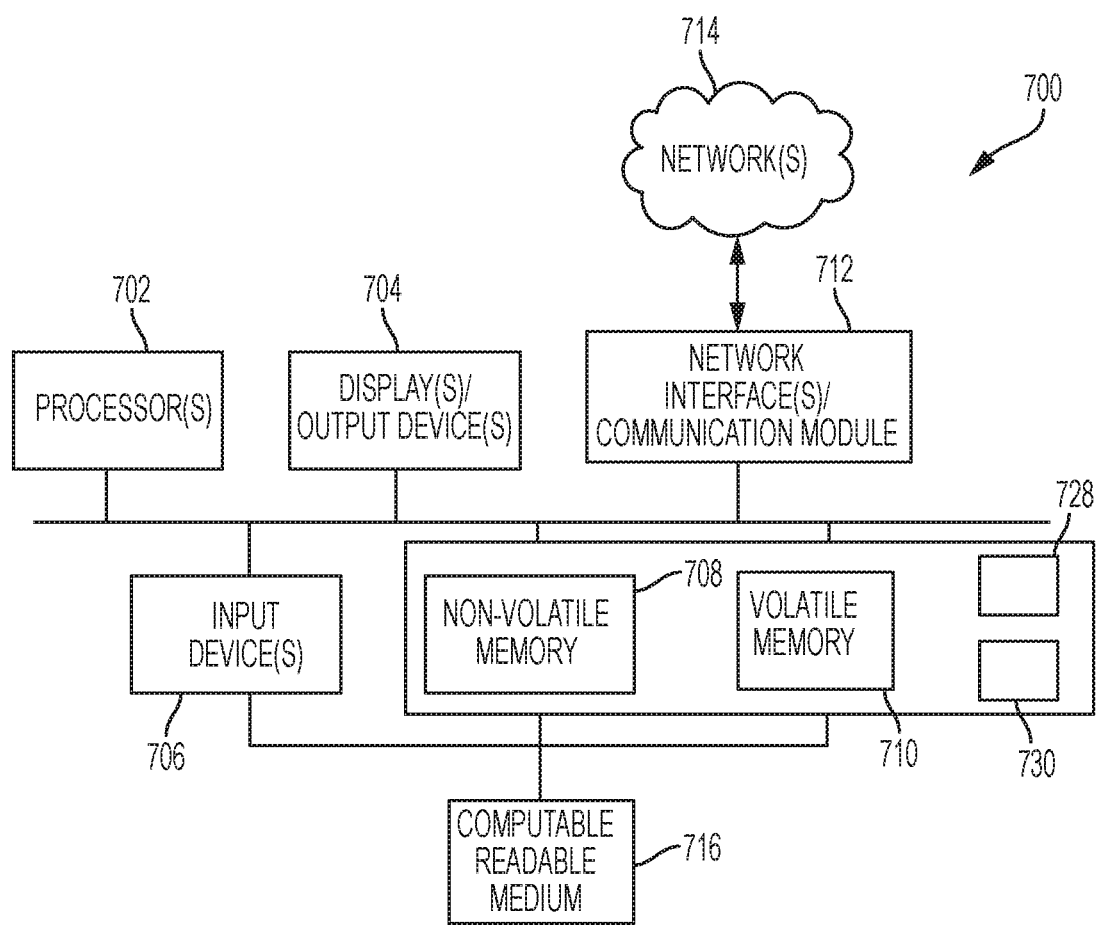
FIG. 6 schematically illustrates a system including a computing device that implements the processes of FIGS. 1A, 1B, 3A and/or 3B, according to one or more embodiments shown and described herein.

Referring to FIG. 6, a block diagram illustrates a system including a computing device 700, through which embodiments of the disclosure can be implemented. The computing device 700 described herein is but one example of a suitable computing device and does not suggest any limitation on the scope of any embodiments presented. The computing device 700 may be communicatively coupled to one or more computing devices through a warehouse management system. Nothing illustrated or described with respect to the computing device 700 should be interpreted as being required or as creating any type of dependency with respect to any element or plurality of elements. In various embodiments, a computing device 700 may include, but need not be limited to, a desktop, laptop, server, client, tablet, smartphone, or any other like device. In embodiments, the computing device 700 may be part of the materials handling vehicle system of an autonomous or semi-autonomous system as described herein. In an embodiment, the computing device 700 includes at least one processor 702 and memory (non-volatile memory 708 and/or volatile memory 710). In embodiments, one or more unique identifiers 728 for respective intersections as described herein and/or one or more warehouse maps 730 may be stored in the memory. The computing device 700 can include one or more displays and/or output devices 704 such as monitors, speakers, headphones, projectors, wearable-displays, holographic displays, and/or printers, for example. Output devices 704 may be configured to output audio, visual, and/or tactile signals and may further include, for example, audio speakers, devices that emit energy (radio, microwave, infrared, visible light, ultraviolet, x-ray and gamma ray), electronic output devices (Wi-Fi, radar, laser, etc.), audio (of any frequency), etc.

The computing device 700 may further include one or more input devices 706 which can include, by way of example, any type of mouse, keyboard, disk/media drive, memory stick/thumb-drive, memory card, pen, touch-input device, biometric scanner, voice/auditory input device, motion-detector, camera, scale, and the like. Input devices 706 may further include sensors, such as biometric (voice, facial-recognition, iris or other types of eye recognition, hand geometry, fingerprint, DNA, or any other suitable type of biometric data, etc.), video/still images, motion data (accelerometer, GPS, magnetometer, gyroscope, etc.) and audio (including ultrasonic sound waves). Input devices 706 may further include cameras (with or without audio recording), such as digital and/or analog cameras, still cameras, video cameras, thermal imaging cameras, infrared cameras, cameras with a charge-couple display, night-vision cameras, three-dimensional cameras, webcams, audio recorders, and the like.

The computing device 700 typically includes non-volatile memory 708 (ROM, flash memory, etc.), volatile memory 710 (RAM, etc.), or a combination thereof. A network interface hardware 712 can facilitate communications over a network 714 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks (such as of a locally mediated embodiment of a traffic management system as described herein) may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. Network interface hardware 712 can be communicatively coupled to any device capable of transmitting and/or receiving data via the network 714. Accordingly, the network interface hardware 712 can include a communication transceiver for sending and/or receiving any wired or wireless communication. For example, the network interface hardware 712 may include an antenna, a modem, LAN port, Wi-Fi card, WiMax card, mobile communications hardware, near-field communication hardware, satellite communication hardware and/or any wired or wireless hardware for communicating with other networks and/or devices.

A computer-readable storage medium 716 may comprise a plurality of computer readable mediums, each of which may be either a computer readable storage medium or a computer readable signal medium. A computer readable storage medium 716 may be non-transitory in that it excludes any transitory, propagating signal as a storage medium and may reside, for example, within an input device 706, non-volatile memory 708, volatile memory 710, or any combination thereof. A computer readable storage medium can include tangible media that is able to store instructions associated with, or used by, a device or system. A computer readable storage medium includes, by way of example: RAM, ROM, cache, fiber optics, EPROM/Flash memory, CD/DVD/BD-ROM, hard disk drives, solid-state storage, optical or magnetic storage devices, diskettes, electrical connections having a wire, or any combination thereof. A computer readable storage medium may also include, for example, a system or device that is of a magnetic, optical, semiconductor, or electronic type. Computer readable storage media and computer readable signal media are mutually exclusive.

A computer readable signal medium can include any type of computer readable medium that is not a computer readable storage medium and may include, for example, propagated signals taking any number of forms such as optical, electromagnetic, or a combination thereof. A computer readable signal medium may include propagated data signals containing computer readable code, for example, within a carrier wave. Computer readable storage media and computer readable signal media are mutually exclusive.

The computing device 700 may include one or more network interfaces (i.e., network interface hardware 712) to facilitate communication with one or more remote devices, which may include, for example, client and/or server devices. A network interface hardware 712 may also be described as a communications module, as these terms may be used interchangeably. For clarity, it is noted that usage of the term "communication" herein, with respect to FIG. 6, or elsewhere, may refer to one-way communication or two-way communication.

For the purposes of describing and defining the present invention, it is noted that reference herein to a variable, result, action, determination, condition, or other object being "based on" a particular condition is not intended to denote that the object is exclusively based on the condition. Rather, reference herein to an object that is "based" on a particular condition is intended to be open ended such that the object may be based on a single condition or a plurality of conditions.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" in a particular way, to embody a particular property, or to function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

The invention claimed is:

1. A traffic management system comprising a traffic management server and a plurality of materials handling vehicles, each of the plurality of materials handling vehicles comprising a vehicle body, a plurality of vehicle wheels, a traction control unit, a braking system, a steering assembly, and a navigation subsystem, wherein:

the plurality of materials handling vehicles are configured to navigate a vehicle transit surface in a warehouse environment;

the plurality of vehicle wheels support the vehicle body;

the traction control unit, the braking system, and the steering assembly, are operatively coupled to one or more of the plurality of vehicle wheels;

the navigation subsystem is configured to cooperate with the traction control unit, the braking system, and the steering assembly to navigate a respective materials handling vehicle of the plurality of materials handling vehicles along the vehicle transit surface in the warehouse environment; and the traffic management server is configured to cooperate with the navigation subsystems of the plurality of materials handling vehicles to:
- receive a request from the navigation subsystem of a target materials handling vehicle to proceed through an intersection;
- determine whether a prior request to proceed through the intersection has been received from a different materials handling vehicle;
- determine whether the prior request comprises a corresponding exit notification indicating that the different materials handling vehicle has progressed through and exited from the intersection;
- transmit permission for the target materials handling vehicle to proceed through the intersection to the navigation subsystem of the target materials handling vehicle in response to a determination that (i) the traffic management server has not received the prior request from the different materials handling vehicle or (ii) the prior request from the different materials handling vehicle comprises the corresponding exit notification; and
- navigate the target materials handling vehicle through the intersection based on the transmission of the permission to proceed through the intersection.

2. The traffic management system of claim 1, wherein the traffic management server is remote from the intersection.

3. The traffic management system of claim 1, wherein the traffic management server is local with respect to and associated with the intersection.

4. The traffic management system of claim 3, wherein the traffic management server comprises one or more smart traffic lights configured to communicate electronically with the navigation subsystem of each of the plurality of materials handling vehicles.

5. The traffic management system of claim 1, wherein the navigation subsystem is further configured to:
transmit a corresponding exit notification to the traffic management server upon exit of the target materials handling vehicle from the intersection.

6. The traffic management system of claim 1, wherein the navigation subsystem is configured to determine whether the target materials handling vehicle is approaching, or has arrived at, the intersection by:
- establishing or recognizing an entry zone associated with the intersection; and
- indicating a presence of the target materials handling vehicle in the entry zone.

7. The traffic management system of claim 6, wherein the navigation subsystem establishes the entry zone as a virtual boundary in the warehouse environment or recognizes a literal entry zone defined by boundary elements in the warehouse environment.

8. The traffic management system of claim 1, wherein the navigation subsystem is further configured to:
- determine whether the target materials handling vehicle is approaching, or has arrived at, the intersection; and
- transmit the request to proceed through the intersection in response to a determination that the target materials handling vehicle is approaching, or has arrived at, the intersection.

9. The traffic management system of claim 8, wherein the navigation subsystem is further configured to:
- receive a wait request from the traffic management server in response to the transmitted request; and
- transmit a re-request to proceed through the intersection in response to the wait request after a period of time.

10. The traffic management system of claim 9, wherein the period of time is in a range of from 5 seconds to 10 seconds.

11. The traffic management system of claim 10, wherein the associated set of road rules accounts for vehicle positioning relative to the intersection, intersection characteristics defining the intersection, or both.

12. The traffic management system of claim 9, wherein the traffic management server is further configured to:
generate an alert for an inspection of the intersection in response to the wait request continuing for over one minute.

13. The traffic management system of claim 8, wherein the navigation subsystem is configured to determine whether the target materials handling vehicle is approaching, or has arrived at, the intersection by interacting with a localization subsystem to determine a position and heading of the target materials handling vehicle relative to the intersection.

14. The traffic management system of claim 1, wherein the navigation subsystem is further configured to:
navigate the target materials handling vehicle through the intersection utilizing an associated set of road rules.

15. The traffic management system of claim 1, wherein the navigation subsystem is further configured to:
- determine whether the target materials handling vehicle is approaching, or has arrived at, the intersection by interacting with a localization subsystem to determine a position and heading of the target materials handling vehicle relative to the intersection;
- transmit the request to proceed through the intersection in response to a determination that the target materials handling vehicle is approaching, or has arrived at, the intersection;
- receive a wait request from the traffic management server in response to the transmitted request; and
- transmit a re-request to proceed through the intersection in response to the wait request after a period of time;
- generate an alert for an inspection of the intersection in response to the wait request continuing for over one minute;
- receive a clearance of the alert for the inspection upon determination that the intersection is clear;
- navigate the target materials handling vehicle through the intersection utilizing an associated set of road rules based on the transmission of the permission to proceed through the intersection and the clearance, wherein the associated set of road rules accounts for vehicle positioning relative to the intersection, intersection characteristics defining the intersection, or both.

16. A method of navigating a plurality of materials handling vehicles with respect to a vehicle transit surface in a warehouse environment, comprising:
utilizing at least one the plurality of materials handling vehicles disposed on the vehicle transit surface, each of the plurality of materials handling vehicles comprising a vehicle body, a plurality of vehicle wheels supporting the vehicle body, a traction control unit, a braking system, and a steering assembly, the traction control unit, the braking system, and the steering assembly operatively coupled to one or more of the plurality of vehicle wheels, and a navigation subsystem, wherein the navigation subsystem is configured to cooperate with the traction control unit, the braking system, and the steering assembly;

utilizing a traffic management server configured to cooperate with the navigation subsystems of the plurality of materials handling vehicles;

receiving a request from the navigation subsystem of a target materials handling vehicle to proceed through an intersection;

determining whether a prior request to proceed through the intersection has been received from a different materials handling vehicle;

determining whether the prior request comprises a corresponding exit notification indicating that the different materials handling vehicle has progressed through and exited from the intersection;

transmitting permission for the target materials handling vehicle to proceed through the intersection to the navigation subsystem of the target materials handling vehicle in response to a determination that (i) the traffic management server has not received the prior request from the different materials handling vehicle or (ii) the prior request from the different materials handling vehicle comprises the corresponding exit notification; and navigating the target materials handling vehicle through the intersection based on the transmission of the permission to proceed through the intersection.

17. The method of claim 16, wherein the traffic management server is remote from the intersection, local with respect to and associated with the intersection, or combinations thereof.

18. The method of claim 17, wherein the traffic management server comprises one or more smart traffic lights configured to communicate electronically with the navigation subsystem of each of the plurality of materials handling vehicles when the traffic management server is local with respect to and associated with the intersection.

19. The method of claim 16, further comprising:

transmitting from the navigation subsystem a corresponding exit notification to the traffic management server upon exit of the target materials handling vehicle from the intersection.

20. The method of claim 16, further comprising:

determining by the navigation subsystem whether the target materials handling vehicle is approaching, or has arrived at, the intersection; and transmitting from the navigation subsystem to the traffic management server the request to proceed through the intersection in response to a determination that the target materials handling vehicle is approaching, or has arrived at, the intersection.

* * * * *